(12) United States Patent
Terakawa et al.

(10) Patent No.: US 6,957,006 B2
(45) Date of Patent: Oct. 18, 2005

(54) OPTICAL ELEMENT AND OPTICAL DEVICE USING THE SAME

(75) Inventors: Yukari Terakawa, Kyoto (JP); Hayami Hosokawa, Kyoto (JP); Yasunari Kitajima, Nagaokakyo (JP); Toshifumi Sumino, Katano (JP); Yoshihisa Ishida, Nagaokakyo (JP)

(73) Assignee: Omron Corporation, Kyoto (JP)

( * ) Notice: Subject to any disclaimer, the term of this patent is extended or adjusted under 35 U.S.C. 154(b) by 224 days.

(21) Appl. No.: 10/366,935

(22) Filed: Feb. 14, 2003

(65) Prior Publication Data
US 2003/0156327 A1 Aug. 21, 2003

(30) Foreign Application Priority Data
Feb. 15, 2002 (JP) .............................. 2002-039073
Nov. 11, 2002 (JP) .............................. 2002-327497

(51) Int. Cl.⁷ ................................................ G02B 6/10
(52) U.S. Cl. ......................... 385/146; 385/39; 385/43; 385/31
(58) Field of Search ............................. 385/31–33, 36, 385/37, 39, 43, 47, 88–94, 129–132, 1, 146; 359/592, 598

(56) References Cited

U.S. PATENT DOCUMENTS

| | | | |
|---|---|---|---|
| 4,703,472 A | 10/1987 | Blumentritt et al. .............. 370/3 |
| 4,775,217 A * | 10/1988 | Ellis ............................ 313/524 |
| 4,838,645 A | 6/1989 | Machler et al. ........... 350/162.23 |
| 4,873,697 A * | 10/1989 | Haeussler et al. ............ 372/108 |
| 6,075,913 A * | 6/2000 | Cohen et al. .................... 385/47 |
| 6,342,871 B1 | 1/2002 | Takeyama ....................... 345/7 |
| 2001/0046351 A1 * | 11/2001 | Kropp .......................... 385/47 |
| 2002/0154879 A1 * | 10/2002 | Yasuda et al. ................. 385/132 |

FOREIGN PATENT DOCUMENTS

| | | | | |
|---|---|---|---|---|
| EP | 0 718 657 A2 | 6/1996 | .......... G02B 26/02 |
| EP | 1 109 041 A1 | 6/2001 | ............ G02B 6/42 |
| EP | 1 253 447 A2 | 10/2002 | ............ G02B 6/13 |
| FR | 2 802 306 A1 | 11/2000 | ............ G02B 6/00 |
| JP | 5-273444 | 10/1993 | |
| JP | 7-270642 | 10/1995 | |
| JP | 10-133052 | 5/1998 | |

(Continued)

OTHER PUBLICATIONS

European Search Report dated Apr. 16, 2003, 3 pages.
Patent Abstracts of Japan Publication No. 05-273444, dated Oct. 22, 1993, 1 page.

(Continued)

Primary Examiner—Sarah Song
(74) Attorney, Agent, or Firm—Osha Liang LLP

(57) ABSTRACT

An optical element that realizes light path conversion of transmitting light at low loss, allows easy incorporation of functions such as light convergence or the like, and can be easily made into a compact size includes upper and lower main surfaces of a light path converting element of a plane shape are facing each other, and a light incoming surface and a light outgoing surface are adjacent surfaces at about 90 degrees. A curved light path converting surface is formed so as to face the light incoming surface and the light outgoing surface. Light coming in from the light incoming surface repeats full reflection between the upper main surface and the lower main surface and goes on, and is reflected by the light path converting surface, thereby the light path thereof is converted, and light is ejected from the light outgoing surface.

11 Claims, 25 Drawing Sheets

FOREIGN PATENT DOCUMENTS

| | | |
|---|---|---|
| JP | 11-238238 | 8/1999 |
| WO | WO 200104671 A2 * | 1/2001 ............ G02B 6/00 |

OTHER PUBLICATIONS

Patent Abstracts of Japan Publication No. 07-270642, dated Oct. 20, 1995, 1 page.

Patent Abstracts of Japan Publication No. 10-133052, dated May 22, 1998, 1 page.

Patent Abstracts of Japan Publication No. 11-238238, dated Aug. 31, 1999, 1 page.

* cited by examiner

PRIOR ART

PRIOR ART

OPTICAL ELEMENT AND OPTICAL DEVICE USING THE SAME

BACKGROUND OF THE INVENTION

1. Field of the Invention

The present invention relates to an optical element and an optical component using the same. More specifically, the invention relates to an optical element for reflecting transmitted light and, thereby, converting a light path and converging light, and an optical device using the same.

2. Description of the Background Art

An optical transceiver 11 in the prior art is explained in reference to FIGS. 1A and 1B. FIG. 1A shows a cross sectional view of a conventional optical transceiver 11, while FIG. 1B shows an enlarged view of the light receiving system thereof viewed from the direction A. Dotted lines in FIGS. 1A and 1B show light paths. In this optical transceiver 11, as shown in FIG. 1A, light ejected from a light projecting element 5 is converged by a lens 18. Thereafter, the light path thereof is bent by about 90 degrees by inclined surfaces of a triangular prism 17, and is combined onto the end surface of an optical fiber 4. Light L ejected from the optical fiber 4 penetrates into a light guide portion 20 and is received by a light receiving element 6.

At present, in the art of optical communications, there is a demand for high communication speed, and along with this demand, there is another demand for compact size of a light receiving element in an optical transceiver. However, in this optical transceiver 11, wherein an optical element of a light receiving system arranged between the light receiving element 6 and the optical fiber 4 does not converge light, light L ejected from the optical fiber 4 will spread as shown in FIG. 1B. Therefore, if the size of the light receiving element 6 is made small, the loss of light L will become large. And, in this optical transceiver 11 of such a structure, because the light receiving surface of the light receiving element 6 faces the direction of the optical fiber 4, light ejected from the light projecting element 5 and reflected by the end surface of the optical fiber 4 will be received as returned light by the light receiving element 6, causing cross talk. This has been a problem in the prior art.

When light ejected from the light projecting element 5 is to be guided to the optical fiber 4, or light going out from the optical fiber 4 is to be guided to the light receiving element 6, if a light path is converted (deflected) and an optical element for converging light is used, light receiving efficiency may be increased. As an example of such an optical element, a light path converting element 1 is explained in reference to FIGS. 2A and 2B. FIG. 2A shows a perspective view of the light path converting element 1, while FIG. 2B shows a top view of a channel type curved wave guide 10 whose cross section area varies with the incoming surface S1 and the outgoing surface S2 thereof, and also shows light behaviors in the curved wave guide 10. In this light path converting element 1, a curved wave guide 10 made of a transparent resin is formed on the upper surface of a substrate 8. When light L going through the optical fiber 4 comes from the incoming surface S1 into the wave guide 10, light L that goes into the curved wave guide 10 repeats full reflection on the upper and lower surfaces and left and right side surfaces of the curved wave guide 10 and goes through the curved wave guide 10. Light L ejected from the outgoing surface S2 of the curved wave guide 10 is received by the light receiving element 6 that is arranged to face the outgoing surface S2. Therefore, the transmitting direction of the light L going through the curved wave guide 10 is bent by the curve of the curved wave guide 10. Because the area of the outgoing surface S2 of the curved wave guide 10 is made smaller than that of the incoming surface S1, light L ejected from the outgoing surface S2 of the curved wave guide 10 is converged, and is received efficiently by the light receiving element 6 with a small light receiving area.

However, in such a curved wave guide 10, in the case wherein the area of the incoming surface S1 is not equal to that of the outgoing surface S2, the curvature at the external circumferential surface will become large. Therefore, as shown in FIG. 2B, light going through the inside of the wave guide 10 leaks out from the external circumferential surface of the curved wave guide 10, causing lost light L', and light transmitting efficiency will be deteriorated. Therefore, in cases involving converting a light path in an optical fiber 4 of the same diameter or so, it was possible to make cross-sectional areas of a wave guide uniform and there was no problem. However, in cases involving converging light L ejected from the optical fiber 4 and receive light by the light receiving element 6 of a small light receiving area, light transmitting loss would become large. As a result, such a conventional curved wave guide appeared inconvenient. This has been another problem in the prior art.

SUMMARY OF THE INVENTION

An optical element according to the present invention may be preferably embodied as one comprising a high refractive index translucent material, characterized in that the optical element is equipped with a light incoming surface, a light outgoing surface that is not parallel with the light incoming surface, a pair of planes that are facing each other, and a curved light path converting surface, and the pair of planes is formed nearly perpendicular to the light incoming surface and the light outgoing surface, and the curved light path converting surface is formed nearly perpendicular to the pair of planes, and the shape thereof is defined so as to reflect and converge light coming from the light incoming surface, and the light coming in from the light incoming surface goes toward the light path converting surface, and via a light path for the light to be reflected and converged on the light path converting surface and go out from the light outgoing surface, and when the light path is projected onto a plane parallel to the planes, the light is reflected substantially only on the light path converting surface.

Another optical element according to the present invention may be preferably embodied as one comprising a high refractive index translucent material, characterized in that the optical element is equipped with a light incoming surface, a light outgoing surface that is not parallel with the light incoming surface, a pair of planes that are facing each other, and a bent light path converting surface, and the pair of planes is formed nearly perpendicular to the light incoming surface and the light outgoing surface, and the curved light path converting surface is formed nearly perpendicular to the pair of planes, and the shape thereof is defined so as to reflect and converge light coming from the light incoming surface, and the light coming in from the light incoming surface goes toward the light path converting surface, and via a light path for the light to be reflected and converged on the light path converting surface and go out from the light outgoing surface, and when the light path is projected onto a plane parallel to the planes, the light is reflected substantially only on the light path converting surface.

An optical device according to the present invention may be preferably embodied as one comprising a first optical element consisting of a light projecting element, a light receiving element, and a high refractive index translucent material, and a second optical element consisting of a high refractive index translucent material, wherein the first optical element is characterized by being equipped with a light incoming surface, a light outgoing surface that is not parallel with the light incoming surface, a pair of planes that are facing each other, and a curved light path converting surface, and the pair of planes is formed nearly perpendicular to the light incoming surface and the light outgoing surface, and the curved light path converting surface is formed nearly perpendicular to the pair of planes, and the shape thereof is defined so as to reflect and converge light coming from the light incoming surface, and the light coming in from the light incoming surface goes toward the light path converting surface, and via a light path for the light to be reflected and converged on the light path converting surface and go out from the light outgoing surface, and when the light path is projected onto a plane parallel to the planes, the light is reflected substantially only on the light path converting surface, and the second optical element is characterized by comprising, a triangular prism made of a high refractive index translucent material that reflects light coming in from a second light incoming surface and transmit the light to a second light outgoing surface, and a light focusing lens arranged on the second light incoming surface, wherein the first optical element and the second optical element are arranged so that the first light incoming surface and the second light outgoing surface are connected with an optical fiber, and the light projecting element is arranged so that light goes into the lens of the second light incoming surface, and the light receiving element is arranged on the first light outgoing surface to which the light coming in from the first light incoming surface reflects on the light path converting surface and is converged.

Another optical device according to the present invention may be preferably embodied as one comprising a first optical element consisting of a light projecting element, a light receiving element, and a high refractive index translucent material, and a second optical element, wherein the first optical element is characterized by being equipped with a light incoming surface, a light outgoing surface that is not parallel with the light incoming surface, a pair of planes that are facing each other, and a curved light path converting surface, and the pair of planes is formed nearly perpendicular to the light incoming surface and the light outgoing surface, and the curved light path converting surface is formed nearly perpendicular to the pair of planes, and the shape thereof is defined so as to reflect and converge light coming from the light incoming surface, and the light coming in from the light incoming surface goes toward the light path converting surface, and via a light path for the light to be reflected and converged on the light path converting surface and go out from the light outgoing surface, and when the light path is projected onto a plane parallel to the planes, the light is reflected substantially only on the light path converting surface, and the second optical element is characterized by comprising, a core made of a high refractive index translucent material that transmits light coming in from a second light incoming surface to a second light outgoing surface, and a cladding substrate made of a material that surrounds the core and whose refractive index is lower than that of the core, wherein the core cross sectional area of the surface parallel to the second light incoming surface is characterized by becoming smaller gradually from the second light incoming surface toward the second light outgoing surface, and the first optical element and the second optical element are laminated via a separating layer so that the first light incoming surface and the second light outgoing surface are on a same single plane, and the light projecting element is arranged near the second light incoming surface, and the light receiving element is arranged near the first light outgoing surface to which the light coming in from the first light incoming surface reflects on the light path converting surface and is converged.

Still another optical device according to the present invention may be preferably embodied as one comprising a first optical element consisting of a light projecting element, a light receiving element, and a high refractive index translucent material, and a second optical element, wherein the first optical element is characterized by being equipped with a light incoming surface, a light outgoing surface that is not parallel with the light incoming surface, a pair of planes that are facing each other, and a curved light path converting surface, and the pair of planes is formed nearly perpendicular to the light incoming surface and the light outgoing surface, and the curved light path converting surface is formed nearly perpendicular to the pair of planes, and the shape thereof is defined so as to reflect and converge light coming from the light incoming surface, the light coming in from the light incoming surface goes toward the light path converting surface, and via a light path for the light to be reflected and converged on the light path converting surface and go out from the light outgoing surface, and when the light path is projected on to a plane parallel to the planes, the light is reflected substantially only on the light path converting surface, and the second optical element is characterized by comprising, a core made of a high refractive index translucent material that transmits light coming in from a second light incoming surface to a second light outgoing surface, and a cladding substrate made of a material that surrounds the core and whose refractive index is lower than that of the core, and the core cross sectional area of the surface parallel to the second light incoming surface is characterized by becoming smaller gradually from the second light incoming surface toward the second light outgoing surface, and the first optical element and the second optical element are laminated via a separating layer so that the first light outgoing surface and the second light incoming surface are on a same single plane, and the light projecting element is arranged near the first light incoming surface, and the light receiving element is arranged near the second light outgoing surface.

Further another optical device according to the present invention may be preferably embodied as one comprising an optical element made of a high refractive index translucent material, and an input/output terminal, wherein the optical element is characterized by being equipped with a light incoming surface, a light outgoing surface that is not parallel with the light incoming surface, a pair of planes that are facing each other, and a curved light path converting surface, and the pair of planes is formed nearly perpendicular to the light incoming surface and the light outgoing surface, and the curved light path converting surface is formed nearly perpendicular to the pair of planes, and the shape thereof is defined so as to reflect and converge light coming from the light incoming surface, and the light coming in from the light incoming surface goes toward the light path converting surface, and via a light path for the light to be reflected and converged on the light path converting surface and go out from the light outgoing surface, and when the light path is projected onto a plane parallel to the planes, the light is reflected substantially only on the light path converting surface, and the input/output terminal is connected so as to be combined with light going out from the light outgoing surface of the optical element, and the optical element and the input/output terminal are made into one body.

BRIEF DESCRIPTION OF THE DRAWINGS

FIG. 1A shows a cross-sectional view of a conventional optical transceiver, while

FIG. 2A shows a perspective view of a channel type curved wave guide whose cross section area varies with the incoming surface and the outgoing surface as a conventional optical element, while

FIG. 18A shows a cross sectional view of a structure of an optical transceiver, while

FIG. 20A shows an exploded perspective view of an optical element employed in the optical transceiver of FIG. 19, while

FIG. 22A shows an exploded perspective view of the optical element employed in the optical transceiver of FIG. 21, while

DESCRIPTION OF THE PREFERRED EMBODIMENTS

First Embodiment

Figure 1A:
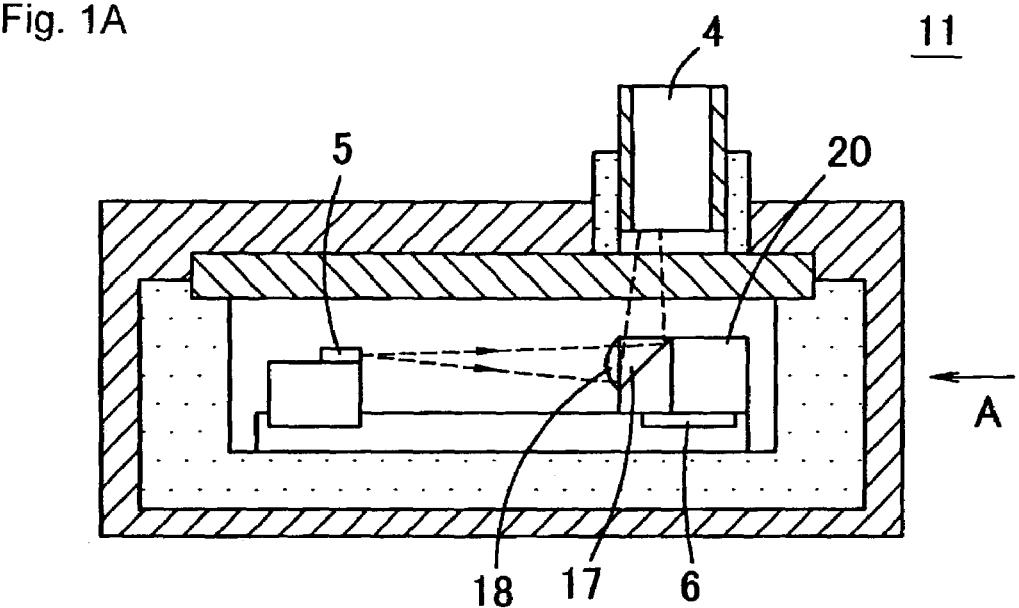
Figure 1B:
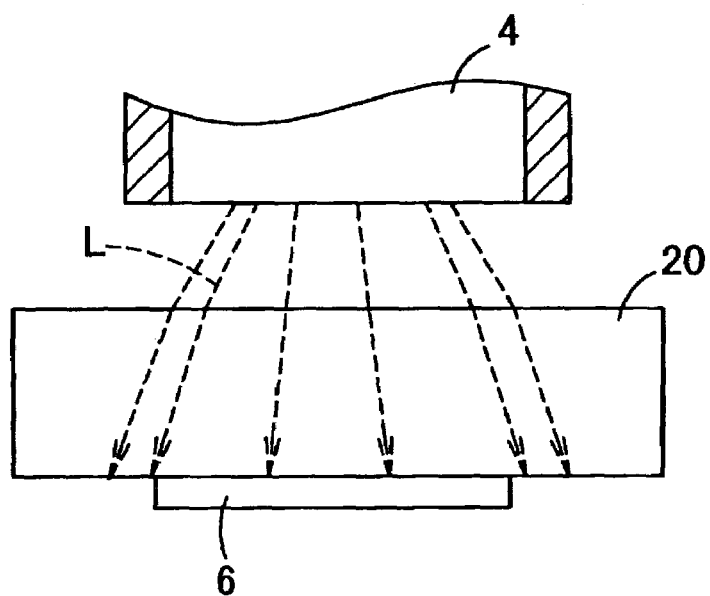
FIG. 1B shows an enlarged top view at A of the light receiving system thereof.
Figure 2A:
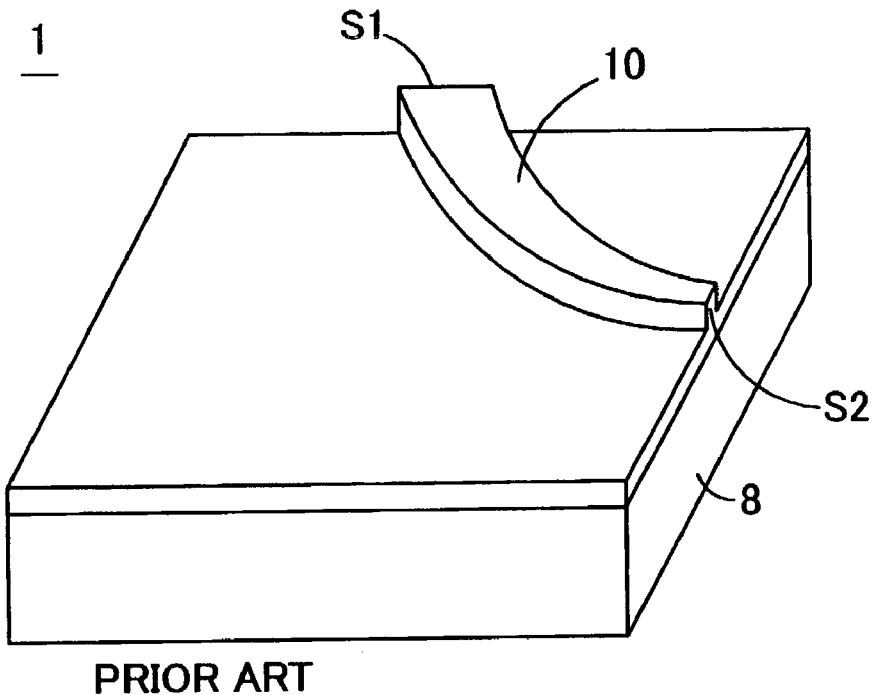
Figure 2B:
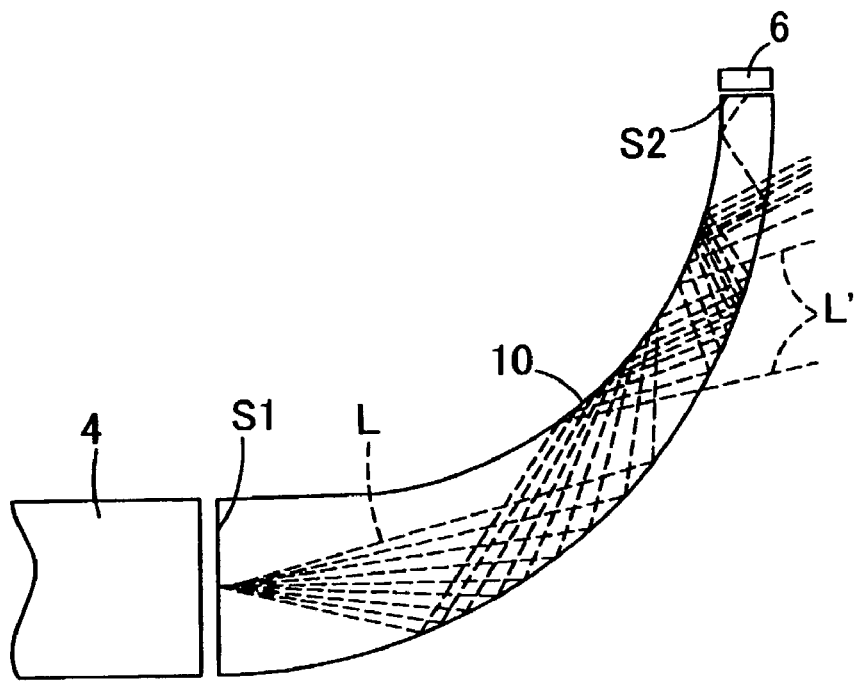
FIG. 2B shows a top view thereof.
Figure 3:
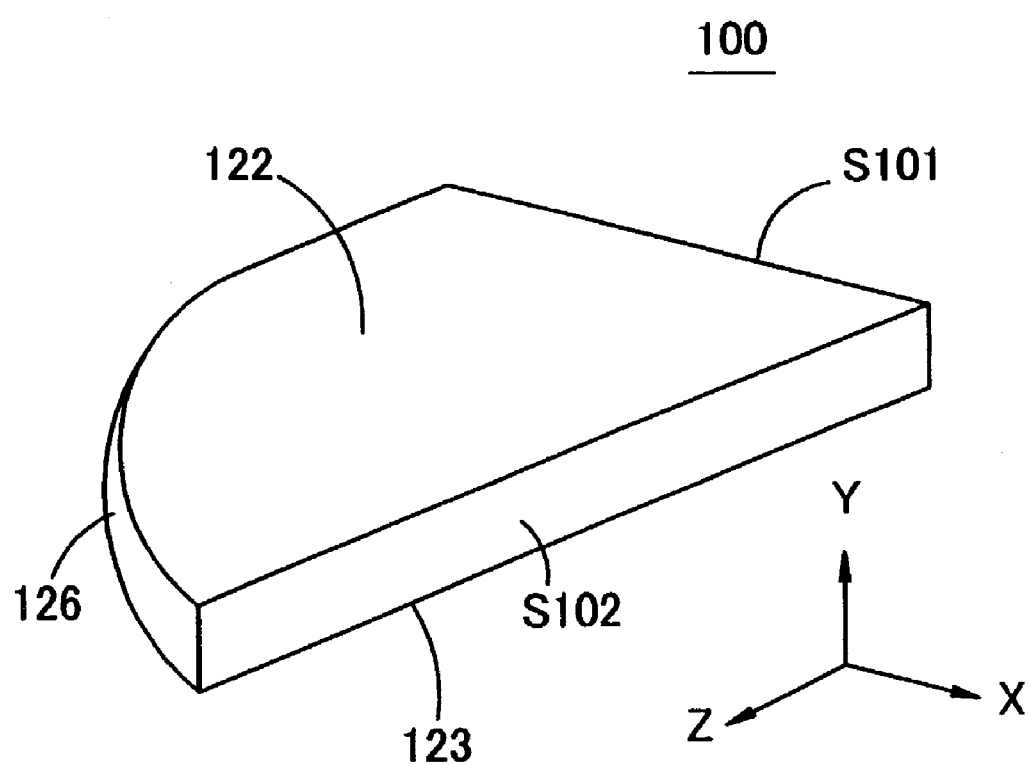
FIG. 3 shows a perspective view of this light path converting element.

A light path converting element as one preferred embodiment of an optical element according to the present invention is explained in reference to FIGS. 3 and 4 below. FIG. 3 shows a perspective view of this light path converting element 100, while FIGS. 4A and 4B show light beam tracing figures of light going through the light path converting element 100. As shown in FIG. 3, in the explanation hereinafter, the Z-axis is defined in the direction of light coming into the light path converting element 100, the X-axis is defined in the direction of light going out from the light path converting element 100, and the Y-axis is defined in the direction perpendicular to the Z-axis and the X-axis (the direction nearly perpendicular to the main surface of the light path converting element 100).

This light path converting element 100 is molded (for example by injection molding) of a transparent resin with a large refractive index (for instance, refractive index n= 1.4–1.5 or so) such as polycarbonate resin or methacrylic resin or the like, and is covered with upper and lower main surfaces 122 and 123 nearly parallel to the Z-X plane. The light path converting element is further covered with a light incoming surface S101 (X-Y plane) and a light outgoing surface S102 (Y-Z plane) respectively at right angles with the above main surfaces, and a light path converting surface 126 curved into an arc shape.

Figure 4A:
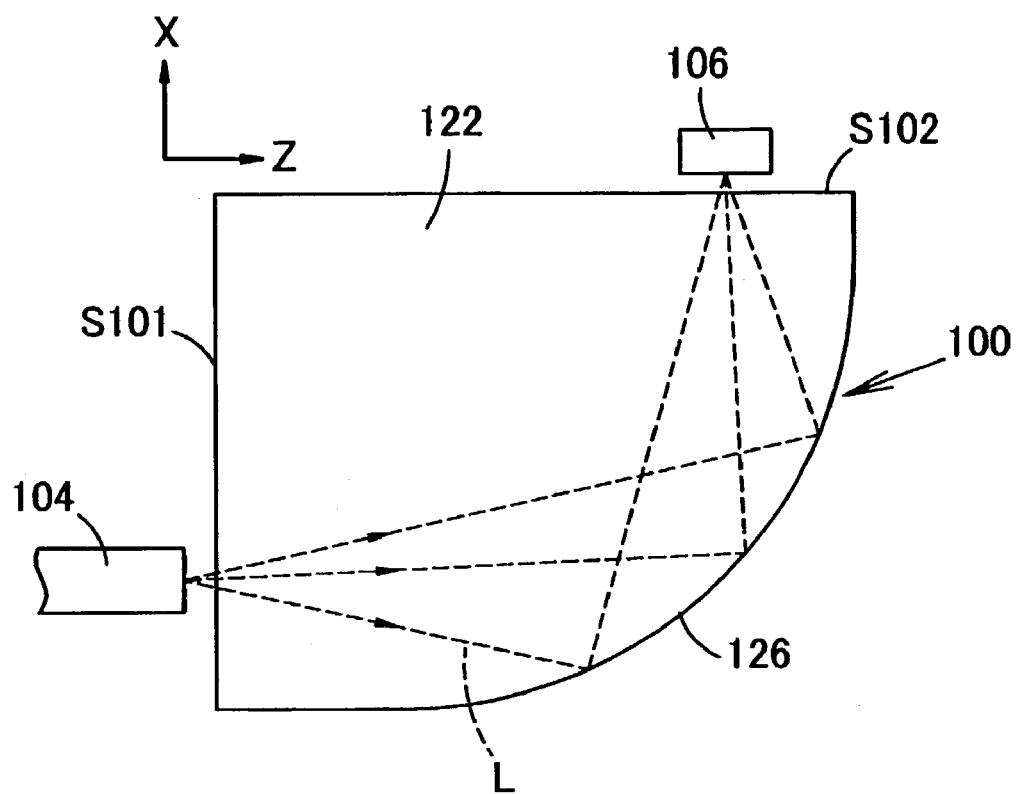
FIGS. 4A and 4B show light beam tracing figures of light going through the light path converting element of FIG. 3.
Figure 4B:
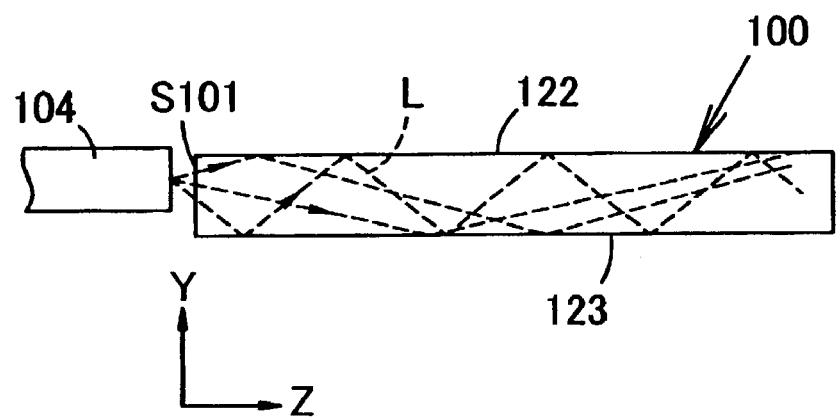

Next, in reference to FIGS. 4A and 4B, actions and effects of the light path converting element 100 are explained. It is supposed that an optical fiber 104 is arranged at a position near the light path converting surface 126 among the light incoming surface S101 of the light path converting element 100, and a light receiving element 106 such as a photo diode, a photo transistor or the like is arranged at the light outgoing surface S102. Light that is ejected from the optical fiber 104 and radiates on the light incoming surface S101 into the inside of the light path converting element 100, and is confined in the light path converting element 100. As shown in FIG. 4B, light beams repeat full reflection on the upper and lower main surfaces 122 and 123 of the light path converting element 100, and continue in the Z-axis direction. Light that goes in the Z-axis direction as mentioned above, as shown in FIG. 4A, comes into the curved light path converting surface 126, where the light is fully reflected and thereby the light axial direction thereof is bent by around 90 degrees. As a result, light starts going on in the X-axis direction, and light ejected from the light outgoing surface S102 is received by the light receiving element 106.

As mentioned above, light going through the light path converting element 100, advances, repeating full reflection on the upper and lower main surfaces 122 and 123, while on the curved light path converting surface 126, it is reflected only once (once by design, however, there is no problem even if there is a light beam that is reflected twice or more). Therefore, light is unlikely to leak out from the light path converting surface 126 as loss. In addition, as shown in FIG. 4A, light fully reflected on the light path converting surface 126 is converged toward the light receiving element 106. As a consequence, it is possible to keep high the light combining efficiency between the optical fiber 104 and the light receiving element 106, and also to bend light axes largely. And because light axes may be bent largely on the light path converting surface 126, light may be reflected only once or so on the light path converting surface 126. As a result, it is possible to convert a light path in a smaller area, and to make the light path converting element 100 into a compact size. Accordingly, an internal circumferential surface nearly parallel with the light path converting surface 126 arranged on the external circumferential side is not arranged (the light reflecting surface of the internal circumferential side is displaced from light path). Thus, the design is made so that light is not reflected on the light incoming surface S101 or the light outgoing surface S102. Further, this optical element 100 employs a flat plane shape, which enables preferable space efficiency and an array arrangement. And, though not illustrated herein, arrangement of a light projecting element in the place of the light receiving element 106 enables to reflect light beams ejected from each light projecting element on the curved surface 126 and converge them toward the end surface of the optical fiber 104, and combine them into the optical fiber 104.

Second Embodiment

Figure 5:
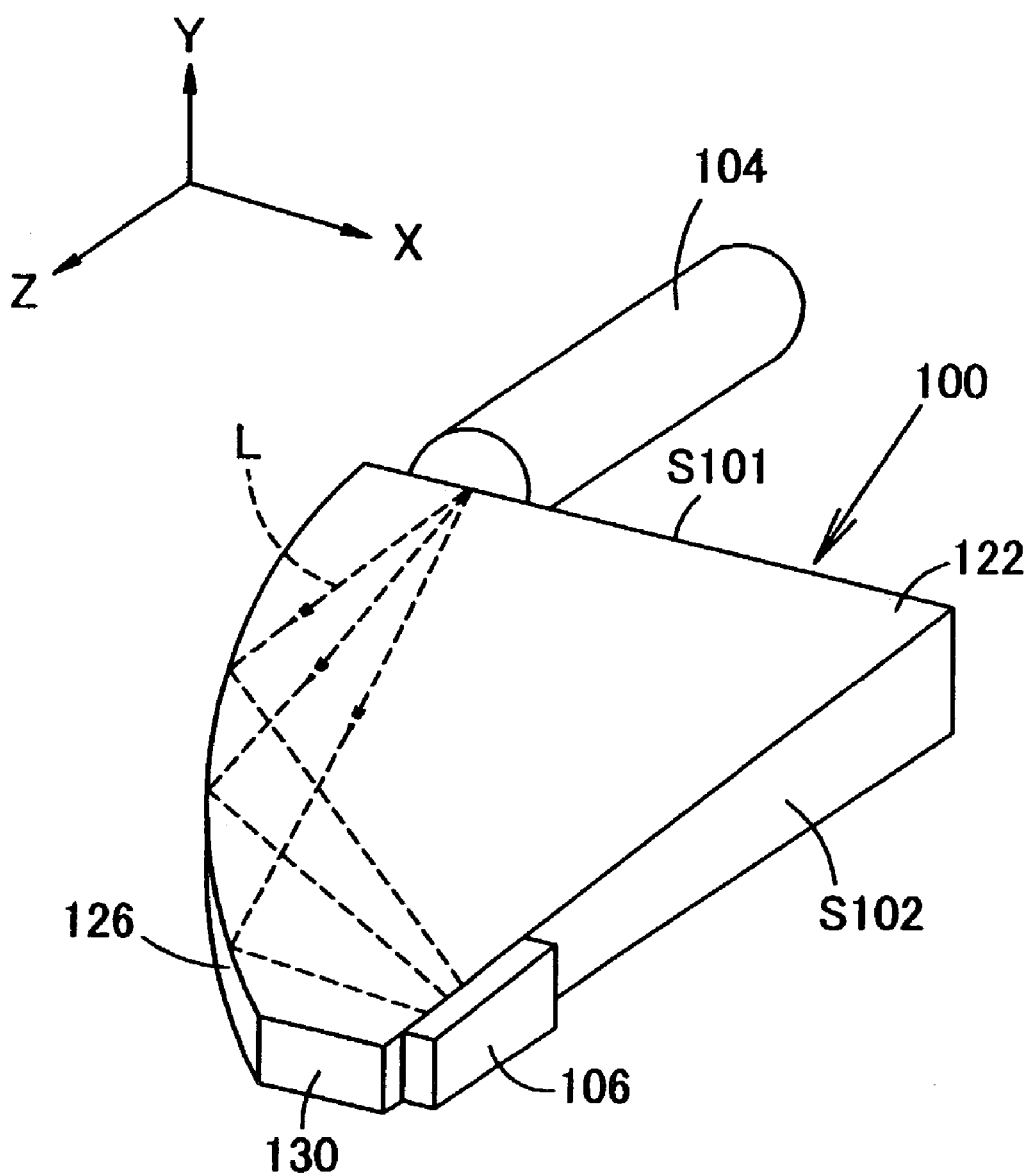
FIG. 5 shows a perspective view for explaining a case wherein an optical fiber is arranged to face the light incoming surface of a light path converting element as another preferred embodiment of an optical element according to the present invention, and a light receiving element is arranged to face the light outgoing surface.

FIG. 5 shows a light path converting element 100 as another preferred embodiment of an optical element according to the present invention. This light path converting element 100 is for increase light converging efficiency, and the thickness thereof is made so as to become gradually thinner from the light incoming side toward the light outgoing side. For example, the thickness of this light path converting element 100, as shown in FIG. 5, becomes thickest at the light incoming surface S101, while thinnest at the side (end surface 130) facing the light incoming surface S101. For this structure, when viewed from the direction perpendicular to the light outgoing surface S102, the light path converting element 100 appears to be a wedge shape.

Figure 6A:
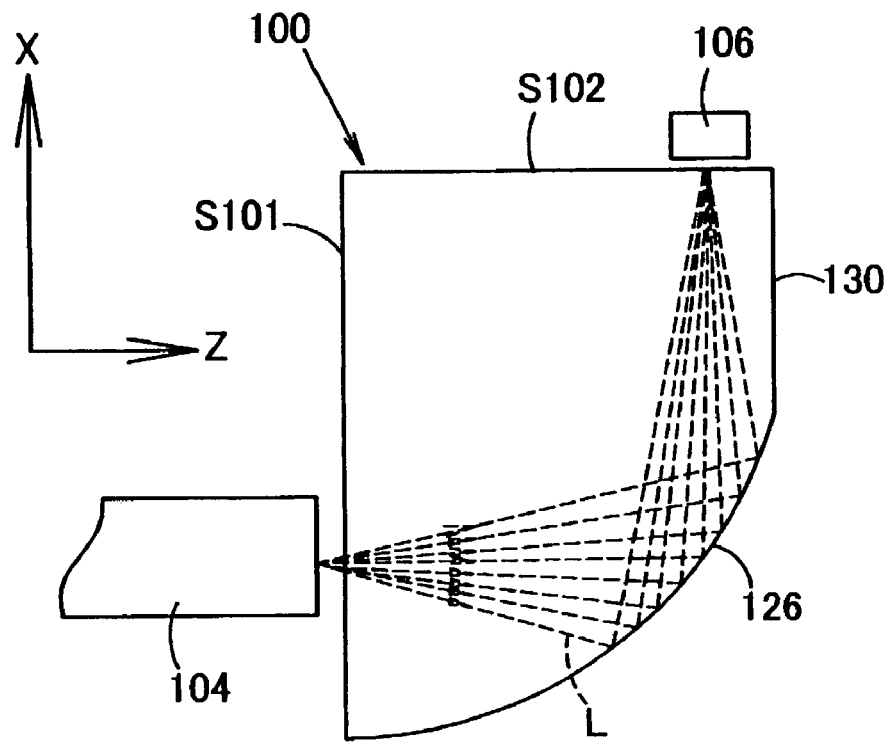
FIGS. 6A and 6B show light beam tracing figures of light going through the light path converting element.
Figure 6B:
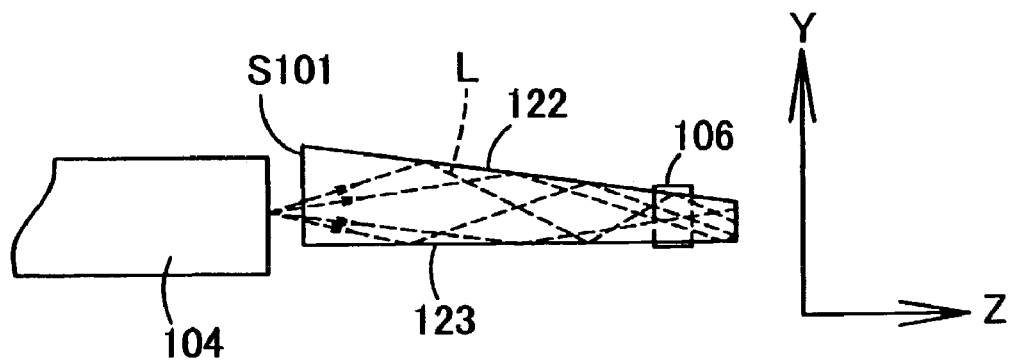

FIG. 5 shows the case wherein an optical fiber 104 is arranged so as to face the light incoming surface S101 of the light path converting element 100, and a light receiving element 106 such as a photo diode, a photo transistor or the like is arranged so as to face the light outgoing surface S102. FIG. 6A shows light behaviors viewed from the Y-axis direction when light is ejected from the optical fiber 104, while FIG. 6B shows light behaviors viewed from the X-axis (negative) direction. In a top view from the Y-axis direction, light that is ejected from the optical fiber 104 and radiates once is fully reflected on the light path converting surface 126 and thereby is converged. Then, the light beams are collected into the light receiving surface of the light receiving element 106. Further, in a top view from the X-axis direction, because the thickness of the light path converting element 100 is made gradually thinner along the light advancing direction, light is gradually converged also in the thickness direction of the light path converting element 100, and light converged into an area narrower than the thickness of the light incoming surface S101 is received by the light receiving element 106. As a consequence, in this light path converting element 100, light is converged in both the Z-X plane and the Y-Z plane, as a result, it shows a structure for high light converging efficiency.

In this light path converting element 100, a portion that does not contribute to light path conversion, namely, an end surface 130 facing the light incoming surface S101 is cut and made parallel with the light incoming surface S101, thereby the light path converting element 100 may be made into a more compact size, and further the number of reference surfaces is increased for easy packaging and handling. And, though not illustrated therein, arrangement of a light projecting element in the place of the light receiving element 106 may enable to reflect light beams ejected from each light projecting element on the curved surface 126 and converge them toward the end surface of the optical fiber 104, and combine them into the optical fiber 104.

Figure 7:
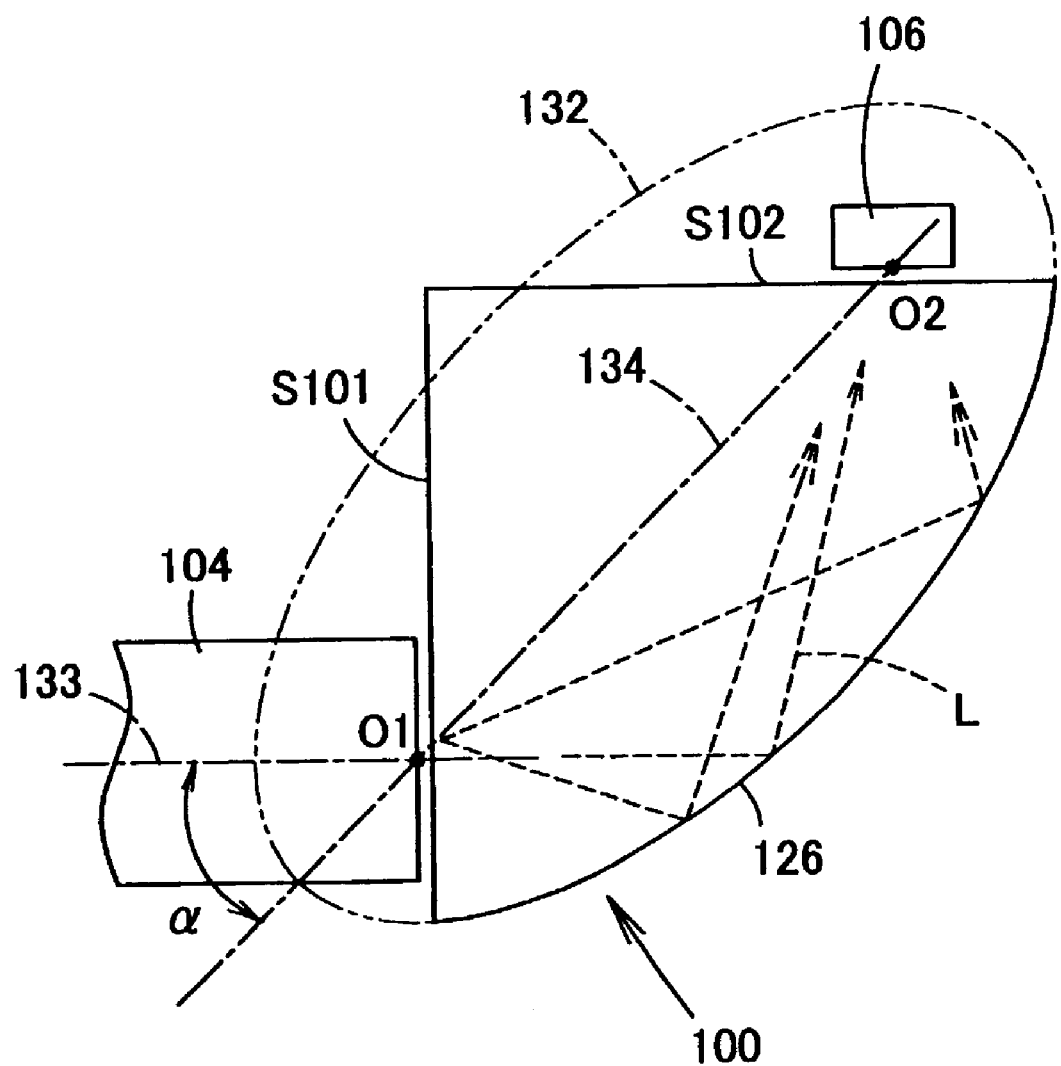
FIG. 7 shows a diagram for explaining the shape of the light path converting surface of the light path converting element.

In order to further improve light converging efficiency, as shown in FIG. 7, the light path converting surface 126 may be made so as become part of an ellipse 132 in the top view. The end surface of a light projecting module such as a light projecting element, an optical fiber 104, or the like may be positioned at one focus O1 of the ellipse 132, while the light receiving module such as the light receiving element 106, an optical fiber, or the like may be positioned at the other focus O2 of the ellipse 132. Especially, it is preferred that the angle α between the light axis 133 of a light projecting module, such as the optical fiber 104, and the long axis 134 of the ellipse 132 is made 45 degrees. In such a structure as mentioned above, light ejected from the light projecting module (at one focus O1 of the ellipse) is reflected on the light path converting surface 126, then is converged into the other focus O2 of the ellipse. Therefore, light is converged into the light receiving module in efficient manners, and light converging efficiency becomes preferably high.

Figure 8:
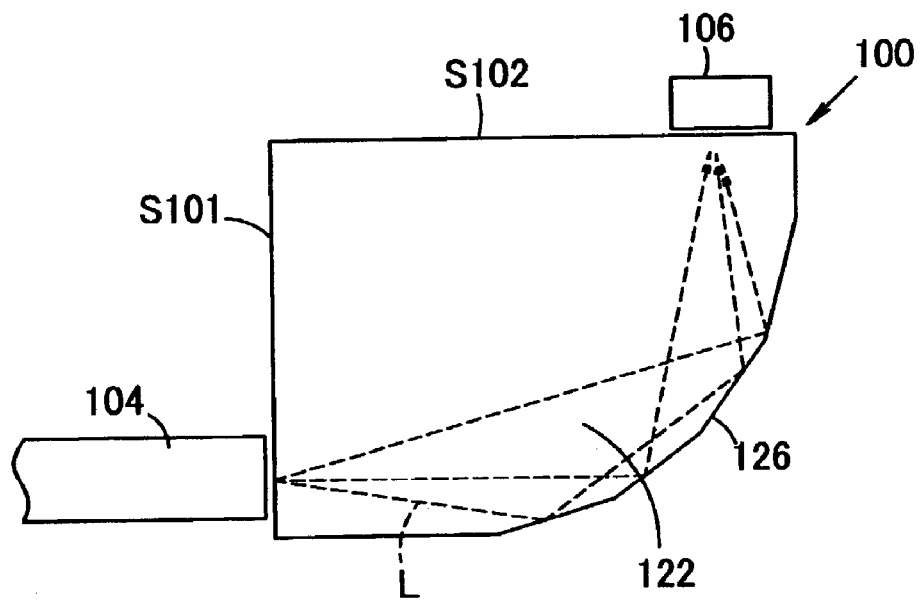
FIG. 8 shows a diagram for explaining a modified example of the light path converting element.
Figure 9:
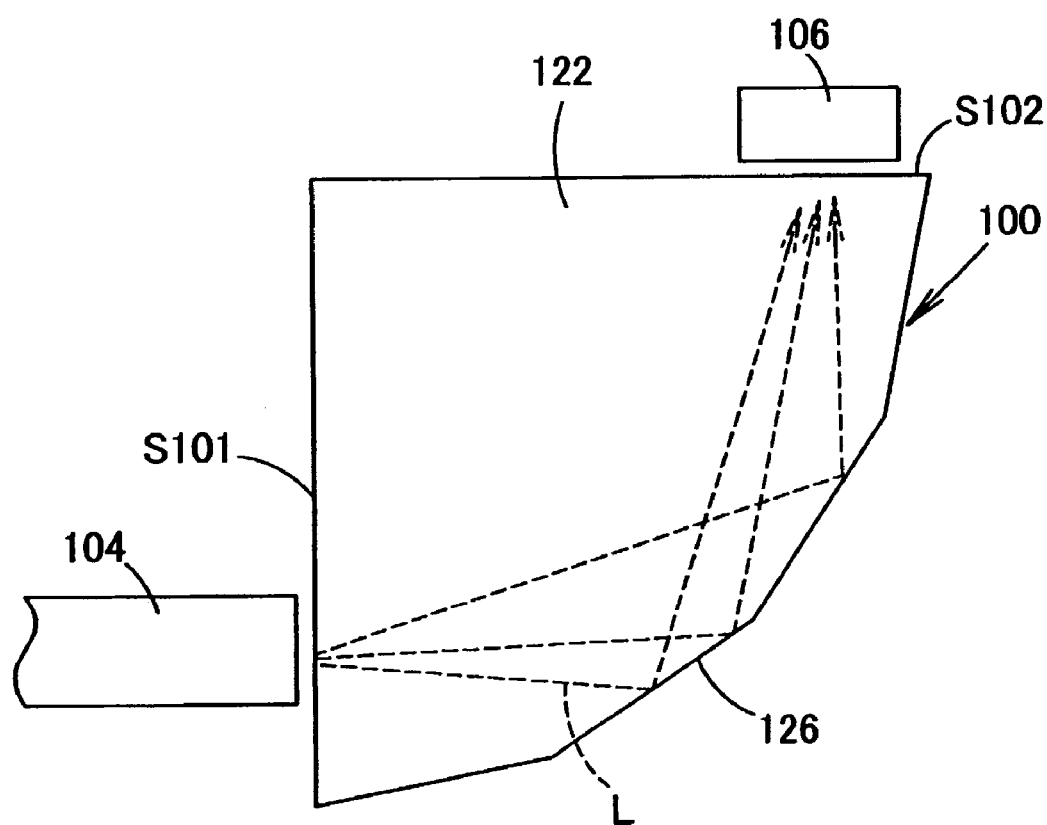
FIG. 9 shows a diagram for explaining another modified example of the light path converting element.

The light path converting surface 126 is not limited to a curved one into an arc shape in top view. As a light path converting element 100 shown in FIG. 8 or FIG. 9 displays, it may also be structured into a curved polygon. Especially, a specific light path converting surface 126 curved into an arc shape may be structured by polygon planes. These light path converting elements 100 may be manufactured by injection molding or cutting a transparent substrate. As a consequence, it is possible to manufacture light path converting elements 100 that enable extremely simple and easy light path conversion and light convergence, and to restrict manufacturing costs.

Figure 10:
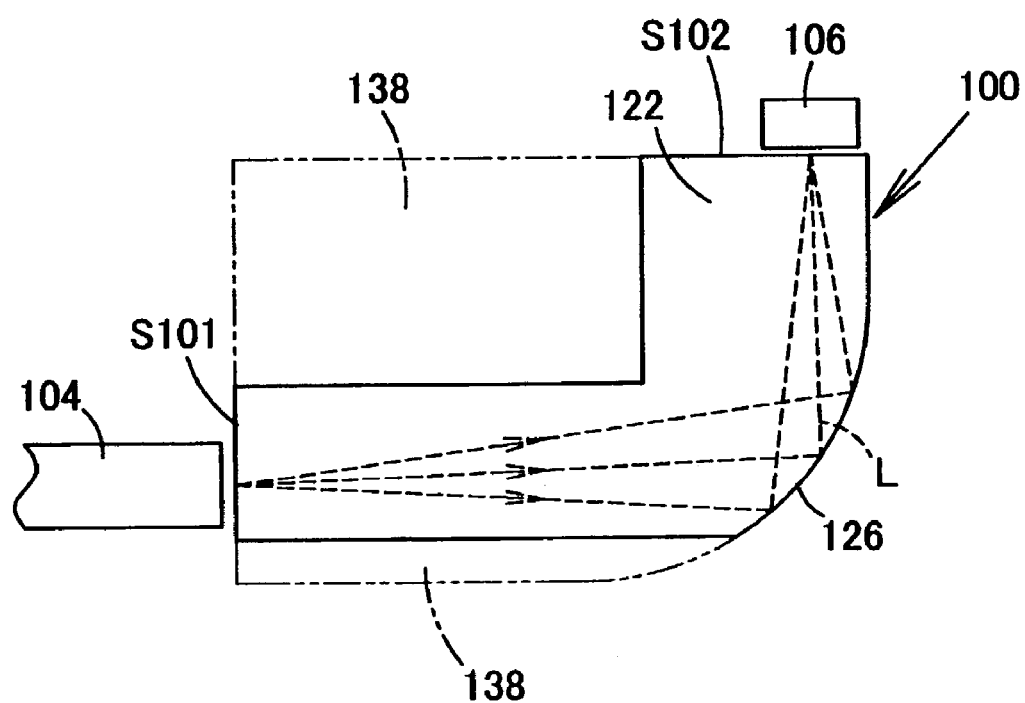
FIG. 10 shows a top view of a light path converting element according to still another preferred embodiment of the present invention.

Further, as shown in FIG. 10, in the case wherein a portion through which light does not go substantially (the area 138 shown by dotted line) may be removed, thereby it is possible to make the size thereof smaller, and also to reduce the cost price thereof through reduction of raw material costs. For example, in the case when the number of apertures (NA) of an optical fiber is 0.5 and the refraction index of the light path converting element 100 is 1.5, light spreading angle at the moment when light goes through the light path converting element 100 appears about 40 degrees. In consideration of this spreading angle, the area 138 may be removed.

Figure 11:
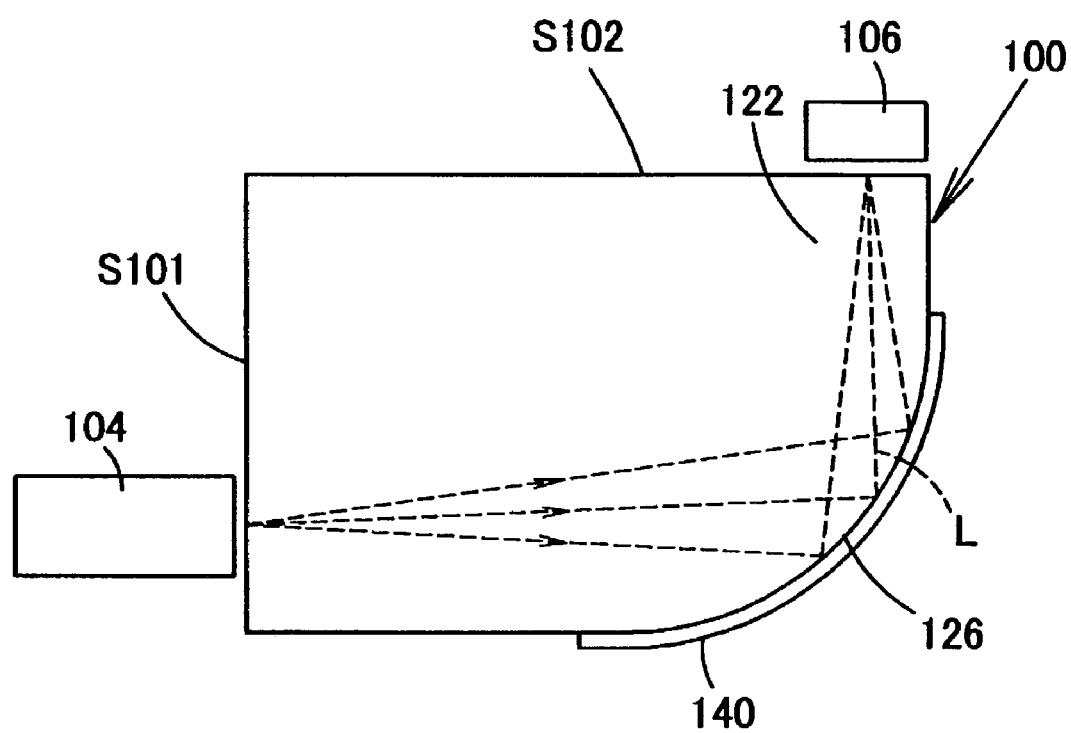
FIG. 11 shows a top view of a light path converting element according to still another preferred embodiment of the present invention.

Furthermore, as shown in FIG. 11, a reflective film 140 maybe formed on a required portion of the light path converting surface 126 by depositing a metallic film, or forming multiple reflective layers. By arranging a reflective film 140 on the light path converting surface 126 of the optical element 100 in the manner mentioned above, it is possible to prevent light leaking out from the light path converting surface 126, and to enhance light transmitting efficiency further.

Third Embodiment

Figure 12:
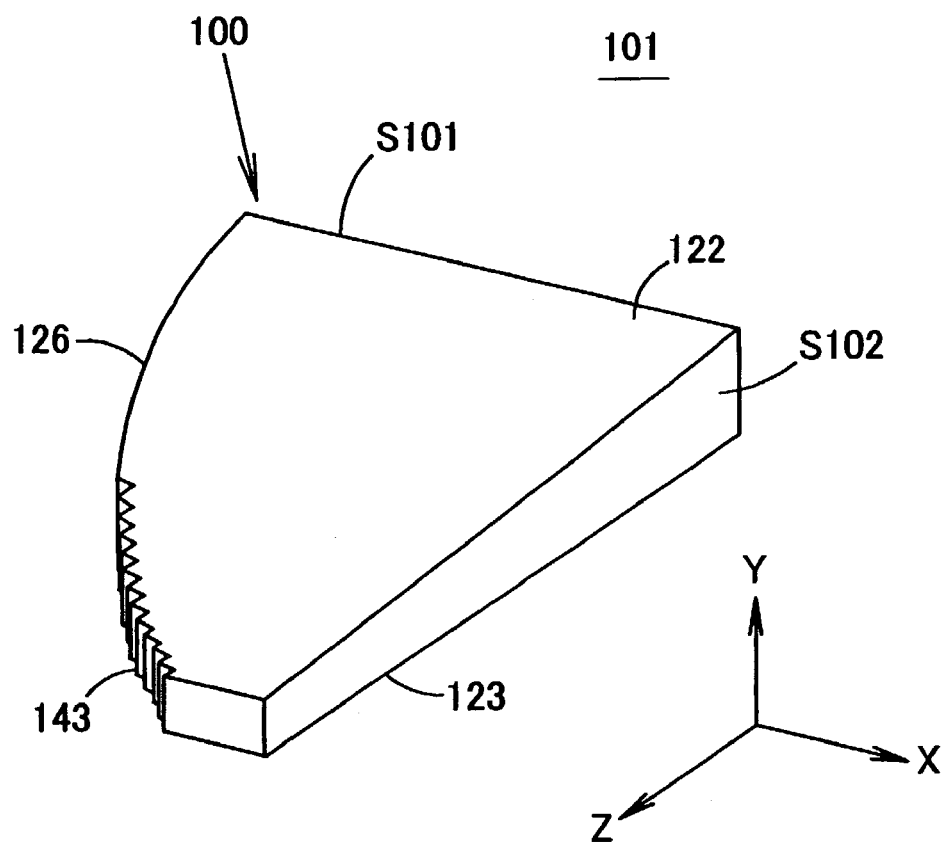
FIG. 12 shows a perspective view of an optical combiner and separator according to still another preferred embodiment of the present invention.

FIG. 12 shows a perspective view of an optical wave combiner and separator 101 as still another preferred embodiment of an optical element according to the present invention. In this optical wave combiner and separator 101, a grating (an optical pattern of a grating shape) 143 is arranged on the light path converting surface 126 of a light path converting element 100 according to the present invention. In other words, a pattern of V-shaped slots expanding in the Y-axis direction is arranged along the light path converting surface 126, and thereby, the grating 143 is formed.

Figure 13:
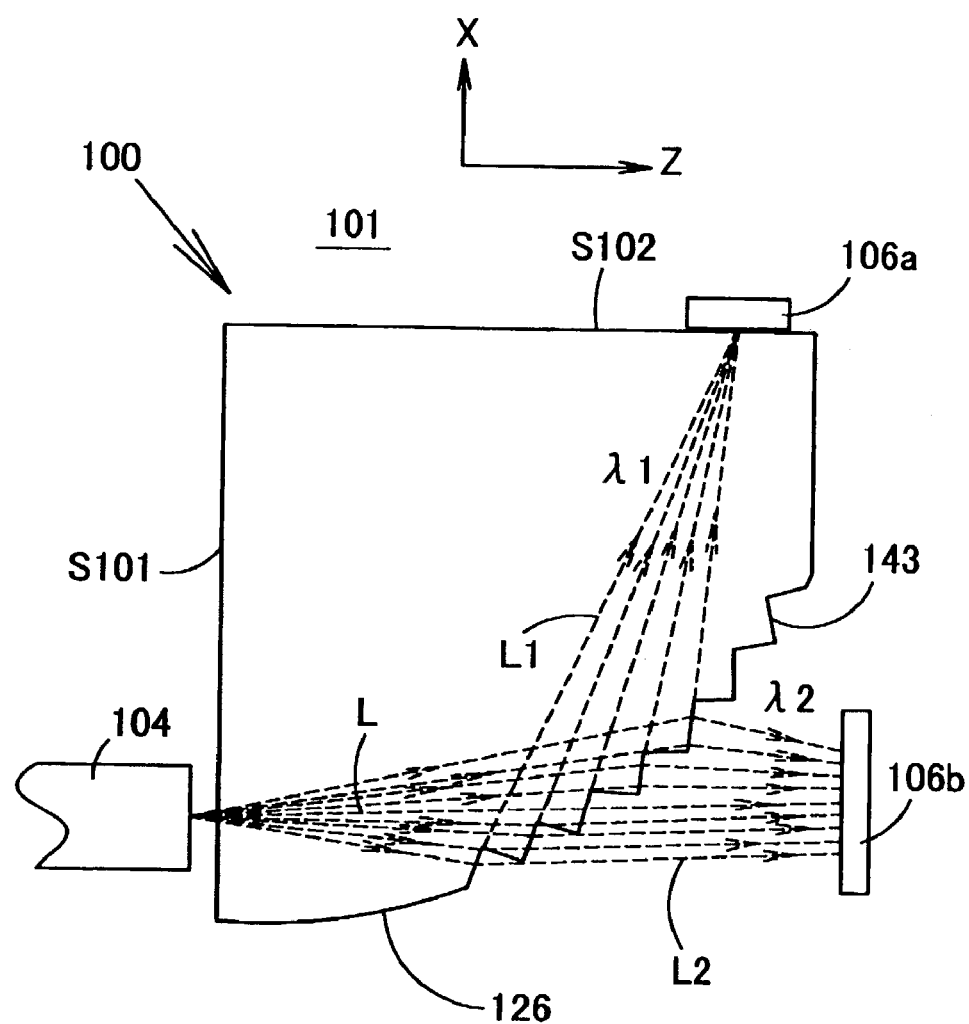
FIG. 13 shows a diagram for explaining the actions of the optical combiner and separator of FIG. 12.

FIG. 13 shows a case wherein the optical wave combiner and separator 101 of FIG. 12 is employed for optical wave separation. An optical fiber 104 is arranged so as to face the light incoming surface S101, one light receiving element 106a is arranged near the focus position of reflection light of wavelength λ1 by the grating 143 on the light outgoing surface S102, and the other light receiving element 106b is arranged near the focus position of penetrating light of wavelength λ2 by the grating 143 so as to face the optical fiber 104 via the grating 143. In this structure, as shown in FIG. 13, light L having light beams of wavelength λ1 and λ2 transmitted through the optical fiber 104 overlap is ejected from the end surface of the optical fiber 104, and then is guided through the light path converting element 100. When light L reaches the grating 143, then light L1 of one wave length λ1 is reflected by the grating 143 and converged toward the light receiving element 106a, and received by the light receiving element 106a. Light L2 of the other wavelength λ2 penetrates into the grating and is converged toward the light receiving element 106b, and is received by the light receiving element 106b.

And, though not illustrated therein, if a light projecting element for generating light of wavelength λ1 is arranged in the place of the light receiving element 106a, and another light projecting element for generating light of wavelength λ2 is arranged in the place of the light receiving element 106b, light of wavelength λ1 ejected from the former light projecting element is reflected by the grating 143, and thereafter is combined into the optical fiber 104, while light of wavelength λ2 ejected from the latter light projecting element penetrates through the grating 143, and thereafter is combined into the optical fiber 104. Thus, light of wavelength λ1 and light of wavelength λ2 are combined into the optical fiber 104. In other words, a device of this preferred embodiment may be employed as an optical wave combiner.

Fourth Embodiment

Figure 14:
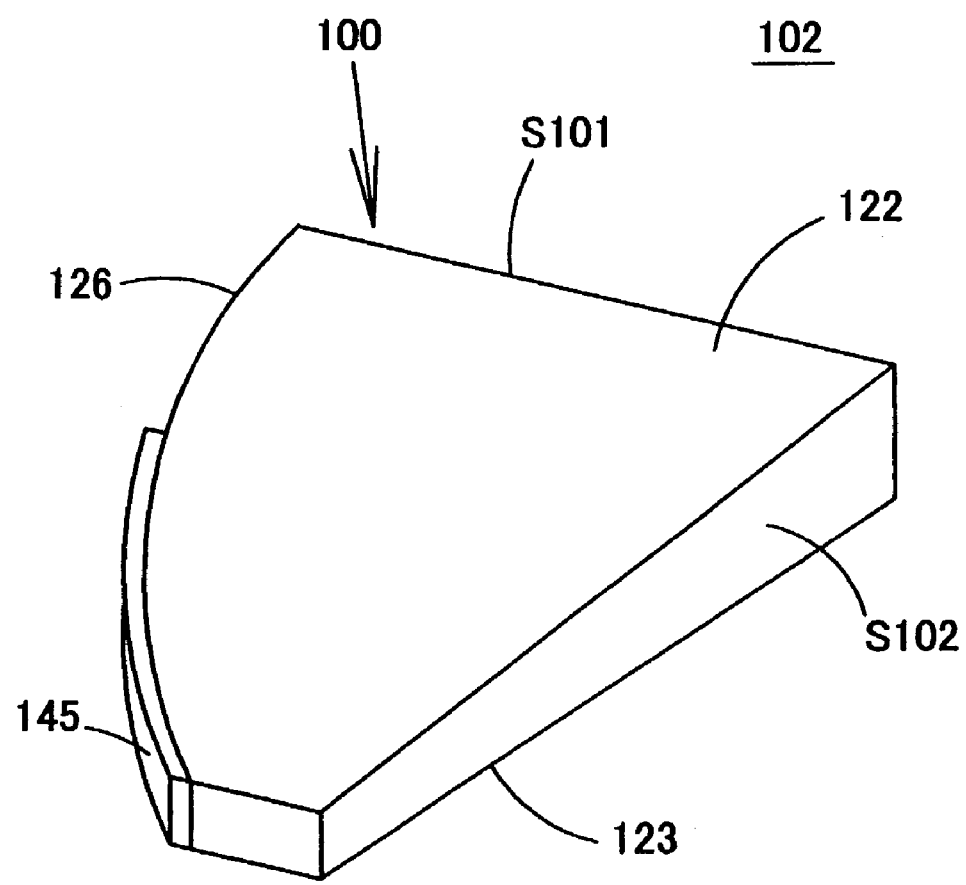
FIG. 14 shows a perspective view of an optical combiner and brancher according to still another preferred embodiment of the present invention.
Figure 15:
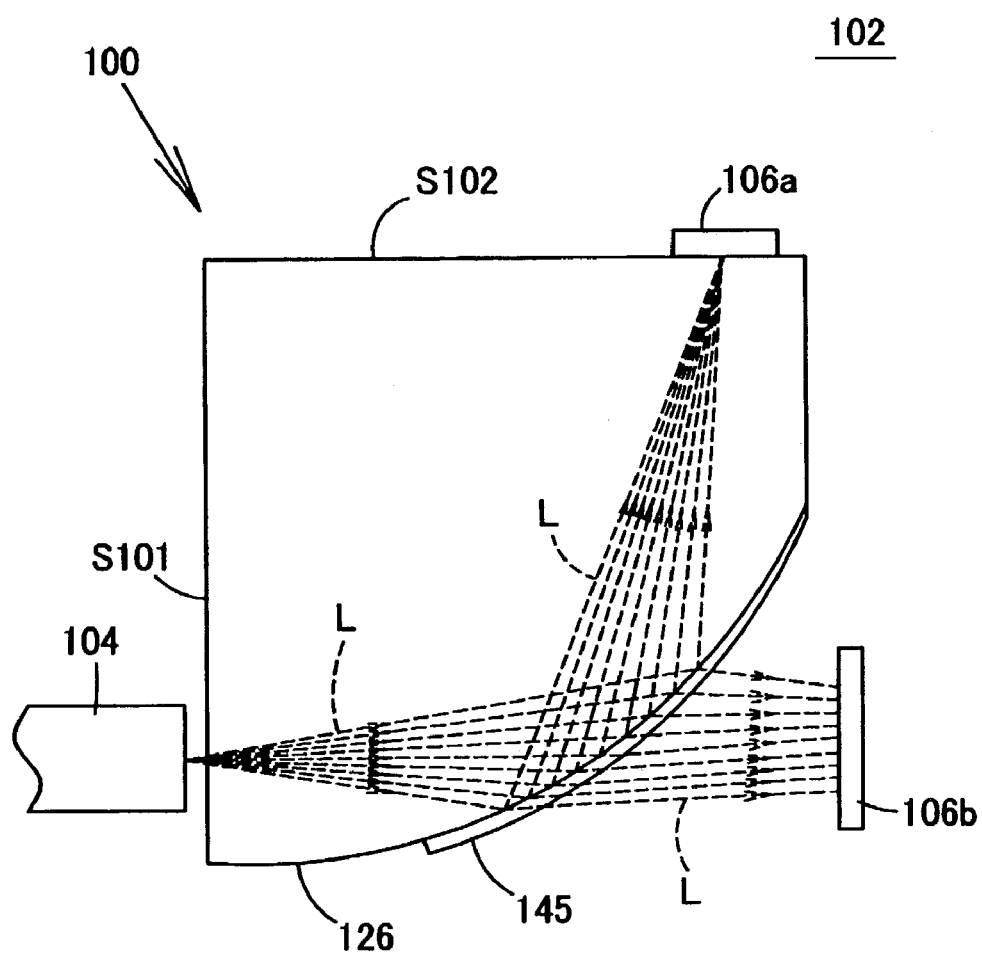
FIG. 15 shows a diagram for explaining the actions of the optical combiner and brancher of FIG. 14.

FIG. 14 shows a perspective view of an optical wave combiner and brancher 102 as still another preferred embodiment of an optical element according to the present invention. In this optical wave combiner and brancher 102, a half mirror 145 is attached onto the light path converting surface 126 of a light path converting element 100 according to the present invention. FIG. 15 shows a case wherein the optical wave combiner and brancher 102 of FIG. 14 is employed for optical wave separation. An optical fiber 104 is arranged so as to face the light incoming surface S101, one light receiving element 106a is arranged on the light outgoing surface S102, while the other light receiving element 106b is arranged in the front of the optical fiber 104 via the half mirror 145.

In this structure, as shown in FIG. 15, when light L is ejected from the optical fiber 104, part of light L going through the light path converting element 100 and coming into the half mirror 145 on the light path converting surface 126 is reflected by the half mirror 145 and converged toward the light receiving element 106a, and is received by the light receiving element 106a. Meanwhile, light L penetrating through the half mirror 145 is moderately converged, and is received by the light receiving element 106b. Accordingly, light L ejected from the optical fiber 104 is separated by the half mirror 145 and is received by the light receiving elements 106a and 106b.

In the place of the half mirror in this preferred embodiment, if a dichroic mirror is attached onto the light path converting surface 126, then the device of this preferred embodiment may be used as an optical wave separator. And, though not illustrated herein, if light projecting elements are arranged in the place of the light receiving elements 106a and 106b, light ejected from one light projecting element is reflected by the half mirror 145, and light ejected from the other light projecting element is penetrated into the half mirror 145. Thus, both the lights may be converged toward the end surface of the optical fiber 104, and may be combined into the optical fiber 104. In other words, a device of this preferred embodiment may be used as an optical wave combiner.

Fifth Embodiment

Figure 16:
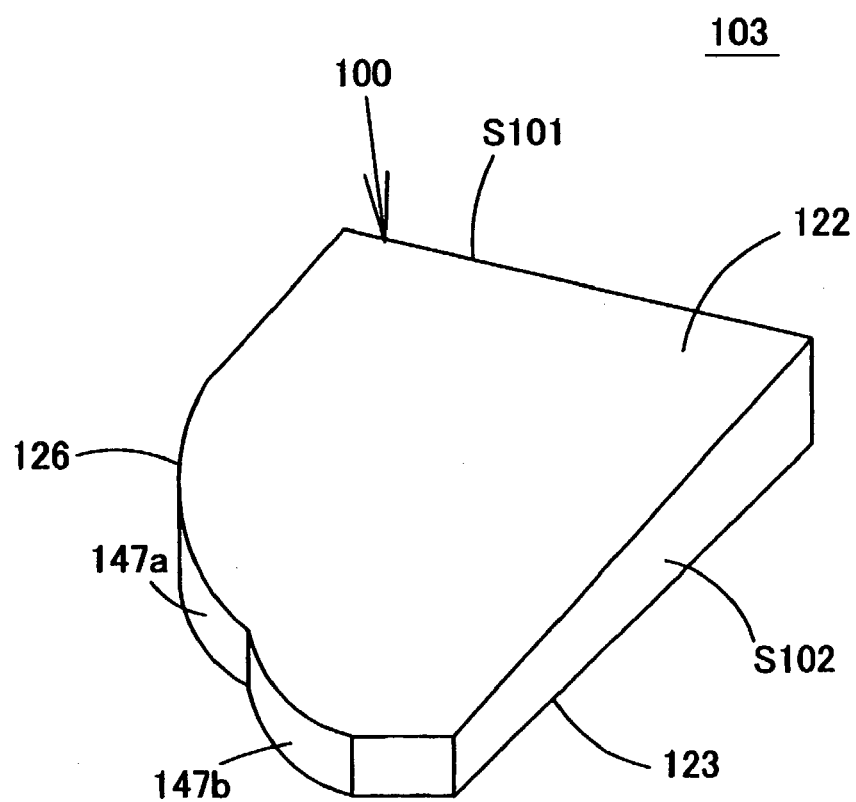
FIG. 16 shows a perspective view of an optical combiner and brancher according to still another preferred embodiment of the present invention.
Figure 17:
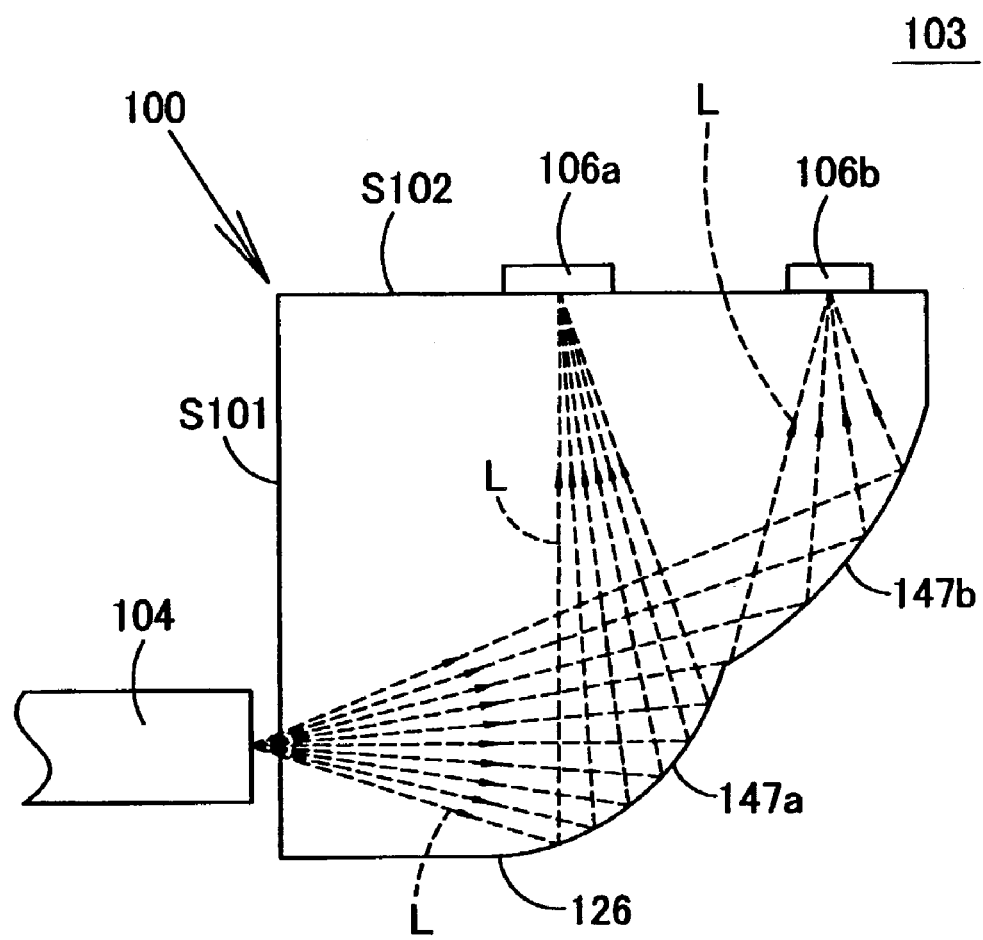
FIG. 17 shows a diagram for explaining the actions of the optical combiner and brancher of FIG. 16.

FIG. 16 shows a perspective view of an optical wave combiner and brancher 103 as still another preferred embodiment of an optical element according to the present invention. In this optical wave combiner and brancher 103, plural adjacent curved surfaces are formed on the light path converting surface 126 of a light path converting element 100 according to the present invention. In FIG. 17, two curved surfaces 147a and 147b are formed on the light path converting surface 126. FIG. 17 shows a case wherein the optical wave combiner and brancher 103 is employed as an optical wave separator. An optical fiber 104 is arranged so as to face the light incoming surface S101. Light L ejected from the optical fiber 104 goes through the light path converting element 100 and is fully reflected by the light path converting surface 126. Light L reflected by the curved surface 147a and light L reflected by the curved surface 147b are converged at different positions on the light outgoing surface S102. Therefore, if one light receiving element 106a is arranged near the light converging point of the light L reflected by the curved surface 147a, while the other light receiving element 106b is arranged near the light converging point of the light L reflected by the curved surface 147b, it is possible to branch light of the optical fiber 104 at the same time as converting the path thereof, and may be received by the light receiving elements 106a and 106b.

And, though not illustrated herein, if light projecting elements are arranged in the place of the light receiving elements 106a and 106b, light ejected from each light projecting element may be reflected by the curved surfaces 147a and 147b respectively, and converged toward the end surface of the optical fiber 104, and combined into the optical fiber 104. In other words, a device of this preferred embodiment may be used as an optical wave combiner.

First Preferred Embodiment Applied to Optical Device

Figure 18A:
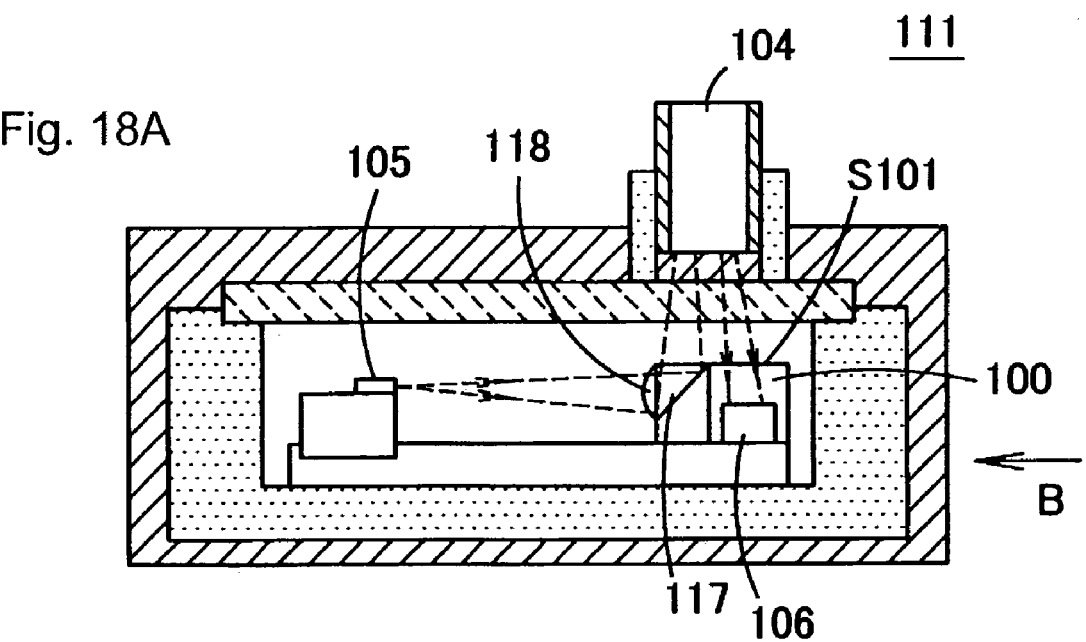
Figure 18B:
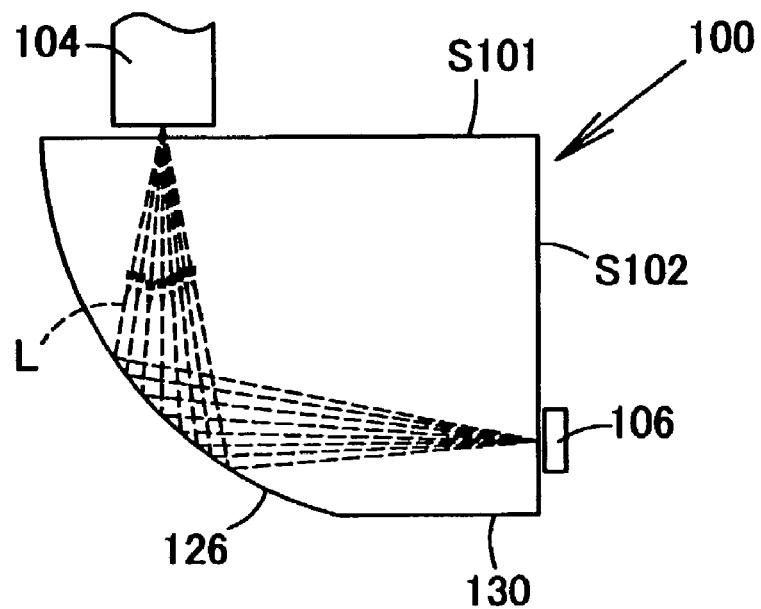
FIG. 18B shows a top view at B of FIG. 18A showing a light receiving portion of the optical transceiver.

FIG. 18 shows an example of an application of an optical element according to the present invention to an optical device. FIG. 18A shows a cross sectional view of a structure of an optical transceiver 111, while FIG. 18B shows a top view at B of FIG. 18A showing a light receiving portion of the optical transceiver 111. Dotted lines in FIGS. 18A and 18B show optical paths of light. In this optical transceiver 111, a light projecting element 105 is packaged on an element supporting portion arranged on the upper surface of a base, and a triangular prism 117 is arranged in the direction of light coming out from the light projecting element 105. A lens 118 is contacted onto a surface of the triangular prism 117 facing the light projecting element 105. A light path converting element 100 is fixed to the position adjacent to the triangular prism 117. (An optical wave combiner and separator 101, or an optical wave combiner and brancher 102 or 103 may also be employed in the place. This is the same hereinafter.) Also, a light receiving element 106 is attached onto a light outgoing surface S102 of the light path converting element 100. Further, the light outgoing surface of the triangular prism 117 and the light incoming surface S101 of the optical element 100 are combined with the optical fiber 104.

In this optical transceiver 111, light ejected horizontally from the light projecting element 105, as shown in FIG. 18A, is converged by the lens 118, thereafter is fully reflected upward by the inclined surface of the triangular prism 117, and is combined into the end surface of the optical fiber 104. On the contrary, light ejected from the optical fiber 104, as shown in FIG. 18B, goes from the light incoming surface S101 into the light path converting element 100, wherein light is guided and fully reflected by the light path converting surface 126. Thereby, the light path thereof is bent by about 90 degrees and light is converged, and is received by the light receiving element 106 arranged on the light outgoing surface S102.

According to such an optical transceiver 111, it is possible to bend the light path of incoming light by the light path converting element 100 and at the same time to converge light into the light receiving element 106. As a consequence, a separate lens for converging light or the like is not necessary, and further it is possible to receive optical signals efficiently using the light receiving element 106 with a small light receiving area.

And, because the light receiving surface of the light receiving element 106 does not face the end surface of the optical fiber 104, it is possible to prevent light ejected from the light projecting element 105 and reflected by the end surface of the optical fiber 104 from being received as returned light by the light receiving element 106. Thereby, it is possible to prevent cross talk of the optical transceiver 111. Further, because the plane wherein light ejected from the light projecting element 105 is transmitted (the plane parallel to the paper surface of FIG. 18A) is at a right angle with the plane wherein light received by the light receiving element 106 (the plane perpendicular to the paper surface of FIG. 18A), even if light ejected from the light projecting element 105 and reflected on the end surface of the optical fiber 104 goes into the light path converting element 100, light hardly goes into the light receiving element 106. As a result, it is possible to prevent cross talk more effectively.

Second Preferred Embodiment Applied to Optical Device

Figure 19:
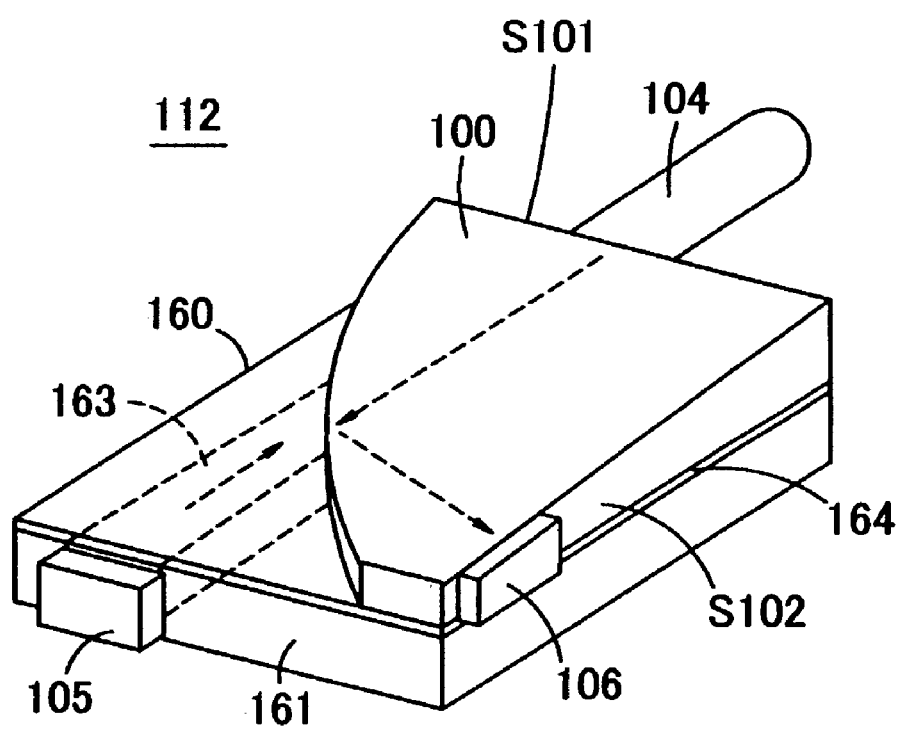
FIG. 19 shows a perspective view of an optical transceiver according to still another preferred embodiment wherein an optical element of the present invention is applied.
Figure 20A:
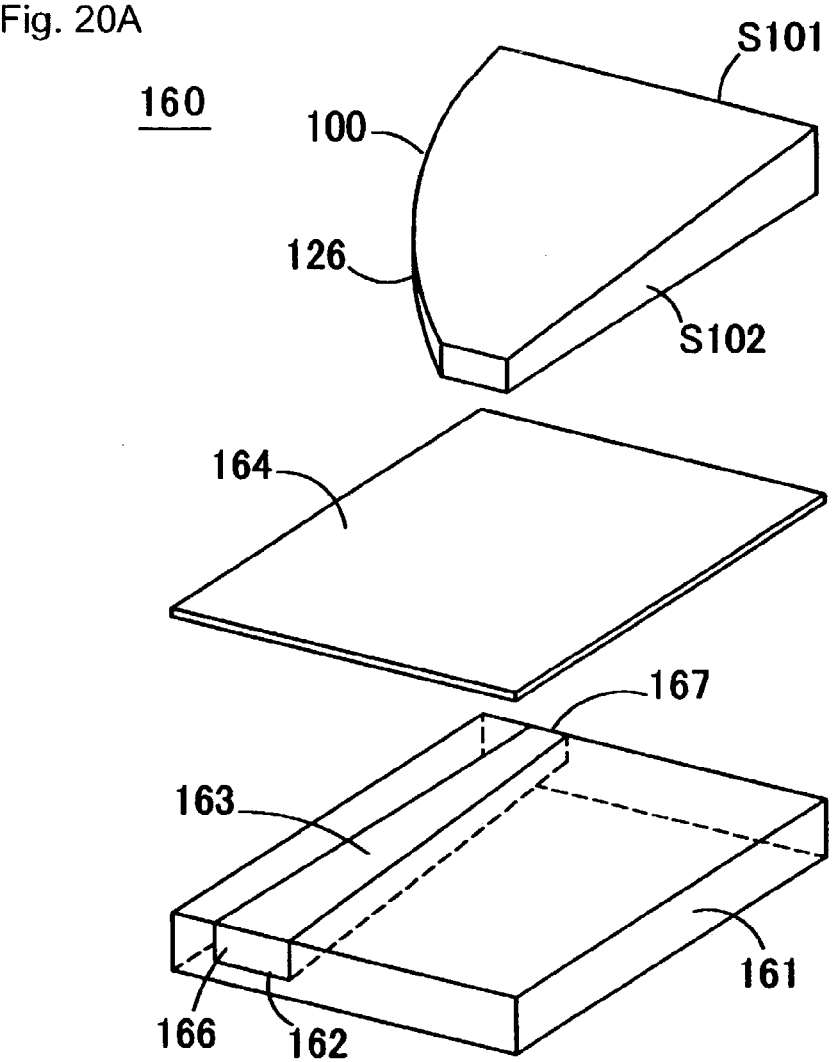
Figure 20B:
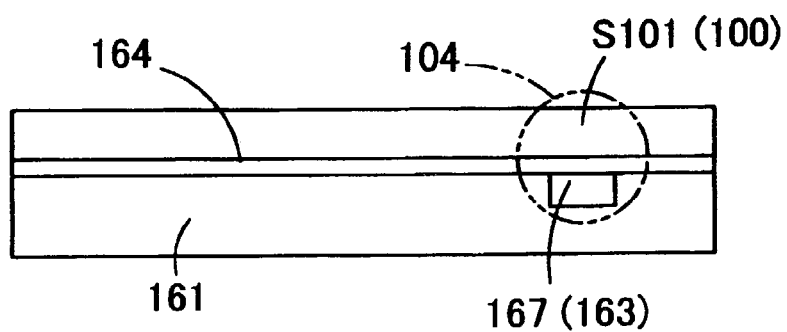
FIG. 20B shows a diagram for explaining the connection of the optical fiber to the optical element.

FIGS. 19 and 20 show an example of an application of an optical element according to the present invention to another optical device. FIG. 19 shows a perspective view of an optical transceiver 112. A light projecting element 105, an optical fiber 104, and a light receiving element 106 are arranged on an optical element 160. FIG. 20A shows an exploded perspective view of the optical element 160 employed in the optical transceiver 112, while FIG. 20B shows a diagram for explaining the connection of the optical fiber 104 to the optical element 160. In the optical element 160 employed herein, as shown in FIG. 20A, a transmitting core 163 is embedded into a straight slot 162 arranged in a cladding substrate 161, and the cladding substrate 161 and the transmitting core 163 are covered with a separation layer 164, and for example, a light path converting element 100 as shown in FIG. 3 or FIG. 5 (An optical wave combiner and separator 101, or an optical wave combiner and brancher 102 or 103 may also be employed in the place. This is the same hereinafter.) is laminated as a receiving core onto the separation layer 164. The refractive index of the transmitting core 163 and the receiving core (light path converting element 100) is made larger than that of the separation layer 164 and the cladding substrate 161. The transmitting core 163 is formed into a tapered shape, wherein the area of one end surface (incoming end surface 166) is larger than that of the other end surface (outgoing end surface 167).

In the optical transceiver 112, as shown in FIG. 19, the light projecting element 105 is arranged on the end surface of the cladding substrate 161 so as to face the incoming end surface 166 of the transmitting core 163, and the light receiving element 106 is attached onto the light outgoing surface S102 of the receiving core (light path converting element 100). And, the outgoing end surface 167 of the transmitting core 163, as shown in FIG. 20B, is positioned below the light incoming surface S101 of the receiving core. An end of the one-core optical fiber 104 is connected to the end portion of the optical transceiver 112 so as to face the outgoing end surface 167 of the transmitting core 163 and the light incoming surface S101 of the receiving core (light path converting element 100). Also, as shown in FIG. 20B, the optical fiber 104 is connected so that the outgoing end surface 167 of the transmitting core 163 is included in the area of the end surface of the optical fiber 104.

In the structure mentioned above, as shown in FIG. 19, light ejected from the light projecting element 105 goes from the incoming end surface 166 into the transmitting core 163, and goes through the transmitting core 163. Light ejected from the outgoing end surface 167 of the transmitting core 163 goes into the optical fiber 104, and is transmitted through the optical fiber 104. On the contrary, light going through the optical fiber 104 goes from the light incoming surface S101 into the receiving core (light path converting element 100), is reflected by the light path converting surface 126 of the receiving core (light path converting element 100), and is converged at the same time. Then, the light is ejected from the light outgoing surface S102 and is received by the light receiving element 106. This optical transceiver 111 may be employed in the case wherein light projected and received by, for example, a photoelectric sensor or the like, is made by use of the one-core optical fiber 104.

Third Preferred Embodiment Applied to Optical Device

Figure 21:
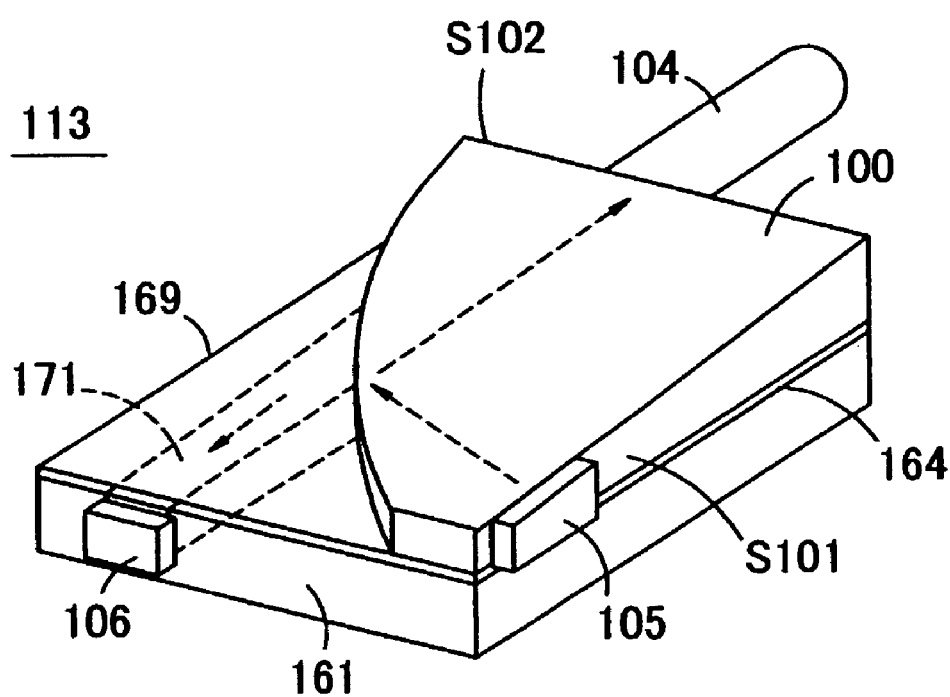
FIG. 21 shows a perspective view of an optical transceiver according to still another preferred embodiment wherein an optical element of the present invention is applied.
Figure 22A:
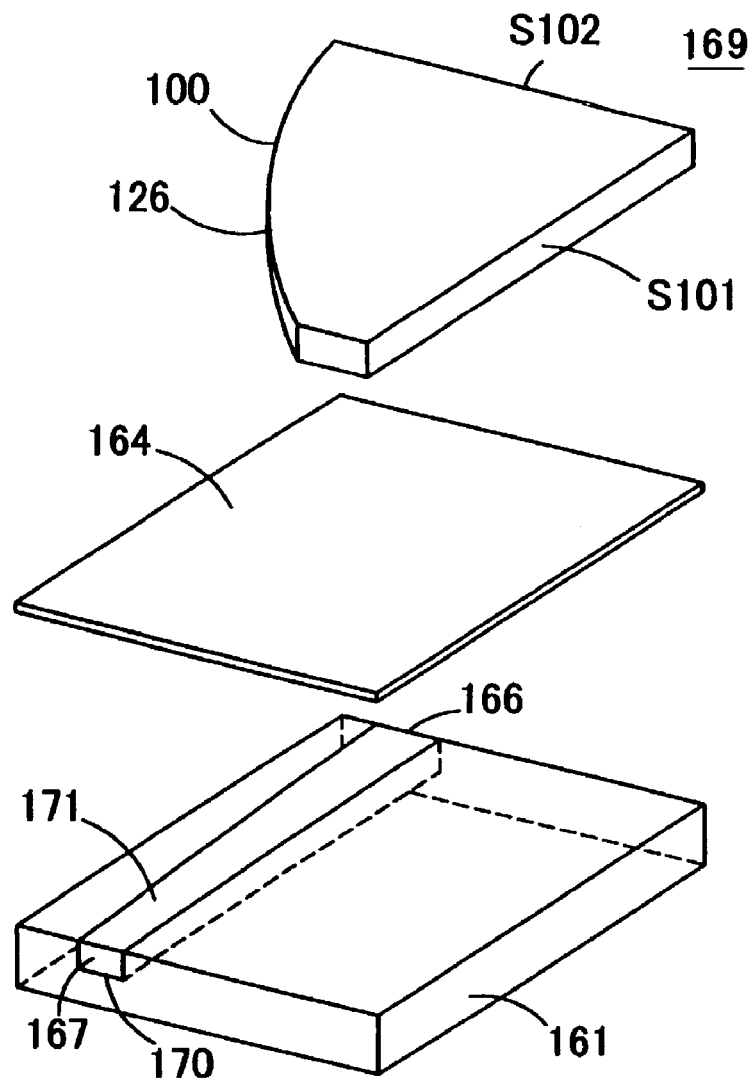
Figure 22B:
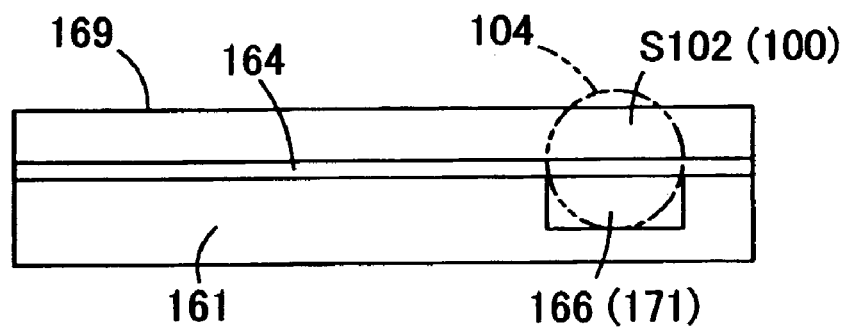
FIG. 22B shows a diagram for explaining the connection of the optical fiber to the optical element.

FIGS. 21 and 22 show an example of an application of an optical element according to the present invention to still another optical device. FIG. 21 shows a perspective view of an optical transceiver 113. A light projecting element 105, an optical fiber 104, and a light receiving element 106 are arranged on an optical element 169. FIG. 22A shows an exploded perspective view of the optical element 169 employed in the optical transceiver 113, while FIG. 22B shows a diagram for explaining the connection of the optical fiber 104 to the optical element 169. In the optical element 169 employed herein, as shown in FIG. 22A, a receiving core 171 is embedded into a straight slot 170 arranged in a cladding substrate 161, and the cladding substrate 161 and the receiving core 171 are covered with a separation layer 164, and for example, a light path converting element 100 as shown in FIG. 3 or FIG. 5 (An optical wave combiner and separator 101, or an optical wave combiner and brancher 102 or 103 may also be employed in the place. This is the same hereinafter.) is laminated as a transmitting core onto the separation layer 164. Herein, the refractive index of the receiving core 171 and the transmitting core (light path converting element 100) is made larger than that of the separation layer 164 and the cladding substrate 161. The receiving core 171 is formed into a tapered shape, wherein the area of one end surface (incoming end surface 166) is larger than that of the other end surface (outgoing end surface 167).

In the optical transceiver 113, as shown in FIG. 21, the light receiving element 106 is arranged on the end surface of the cladding substrate 161 so as to face the outgoing end surface 167 of the receiving core 171, and the light projecting element 105 is attached onto the light incoming surface S101 of the transmitting core (light path converting element 100). And, the incoming end surface 166 of the receiving core 171, as shown in FIG. 22B, is positioned below the light outgoing surface S102 of the transmitting core (light path converting element 100). An end of the one-core optical fiber 104 is connected to the end portion of the optical transceiver 113 so as to face the incoming end surface 166 of the receiving core 171 and the light outgoing surface S102 of the transmitting core (light path converting element 100). Also, as shown in FIG. 22B, the optical fiber 104 is connected so that the incoming end surface 166 of the receiving core 171 sticks out from the area of the end surface of the optical fiber 104.

In the structure mentioned above, as shown in FIG. 21, light ejected from the light projecting element 105 goes from the light incoming surface S101 into the transmitting core (light path converting element 100), and is reflected by the light path converting surface 126 of the transmitting core (light path converting element 100) and is converged at the same time. The light is then ejected from the light outgoing surface S102 and goes into the end surface of the optical fiber 104, and is transmitted along the optical fiber 104. On the contrary, light going through the optical fiber 104 goes from the incoming end surface 166 into the receiving core 171, and is transmitted through the receiving core 171. Light ejected from the outgoing end surface 167 of the receiving core 171 is received by the light receiving element 106. According to the above optical transceivers, 111, 112, and 113, it is possible to make an optical transceiver into a compact size, and enhance high communication speed, and further to reduce light loss and cross talk.

Fourth Preferred Embodiment Applied to Optical Device

Figure 23:
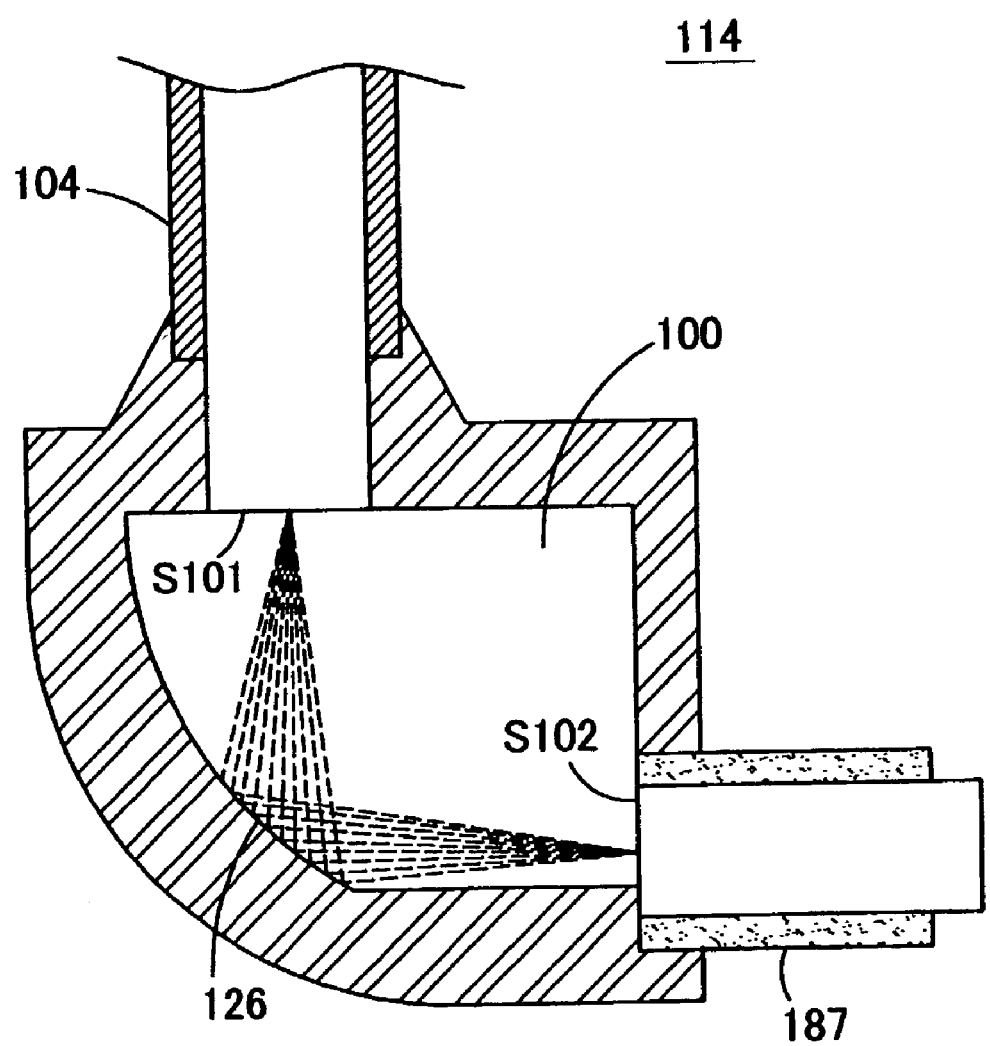
FIG. 23 shows a cross sectional view of a structure of a curved connector to which an optical element according to the present invention is applied.

FIG. 23 shows an example of an application of an optical element according to the present invention to still another optical device. FIG. 23 shows a cross sectional view of a structure of a curved connector 114. In this curved connector 114, one end surface of a one-core optical fiber 104 is arranged to face the light incoming surface S101 or the light outgoing surface S102 of a light path converting element 100 according to the present invention (An optical wave combiner and separator 101, or an optical wave combiner and brancher 102 or 103 may also be employed in the place. This is the same hereinafter.), and the base end surface of an input/output terminal 187 is arranged to face the light outgoing surface S102 or the light incoming surface S101 of the light path converting element 100.

This curved connector 114, which may transmit light in both directions between the optical fiber 104 and the input/output terminal 187, is to be optically connected with a corresponding connector by inserting the input/output terminal 187 portion thereof into such a corresponding connector (for example, a connector for inputting and outputting signals arranged on a device). For example, by arranging this curved connector 114 to both ends of a cord (an optical fiber 104), and by inserting this curved connector into two devices for optical communication, optical communication between these two devices may be realized.

In such a curved connector 114, when inserted into a device, its cord or connector will not protrude as largely as in a straight type connector, which is preferable. However, if such a curved connector was realized by bending an optical fiber in a connector, because the minimum curve radius of an optical fiber was as large as 25 mm, it was difficult to make such a curved connector into a compact size. Meanwhile, according to a curved connector 114 using an optical element of the present invention, it is possible to realize an optical element for bending light path in around 3–5 mm, as a result, it is possible to make an extremely small curved connector. Further, this curved connector 114 also enables to converge light beams by a light path converting element 100. Accordingly, this curved connector may be connected with an optical fiber or an optical guide (a wave guide) and the like of different core diameters.

The respective preferred embodiments mentioned above are not specifically limited to use of a light projecting module or a light receiving module, and it will be understood by those skilled in the art that any structure of, for example, a light projecting element→an optical element→a light receiving element, a light projecting element→an optical element→an optical fiber, and an optical fiber→an optical element→a light receiving element. While, as an optical fiber, a step index type plastic optical fiber may be employed, however, the present invention is not limited to this type.

Fifth Preferred Embodiment Applied to Optical Device

Figure 24:
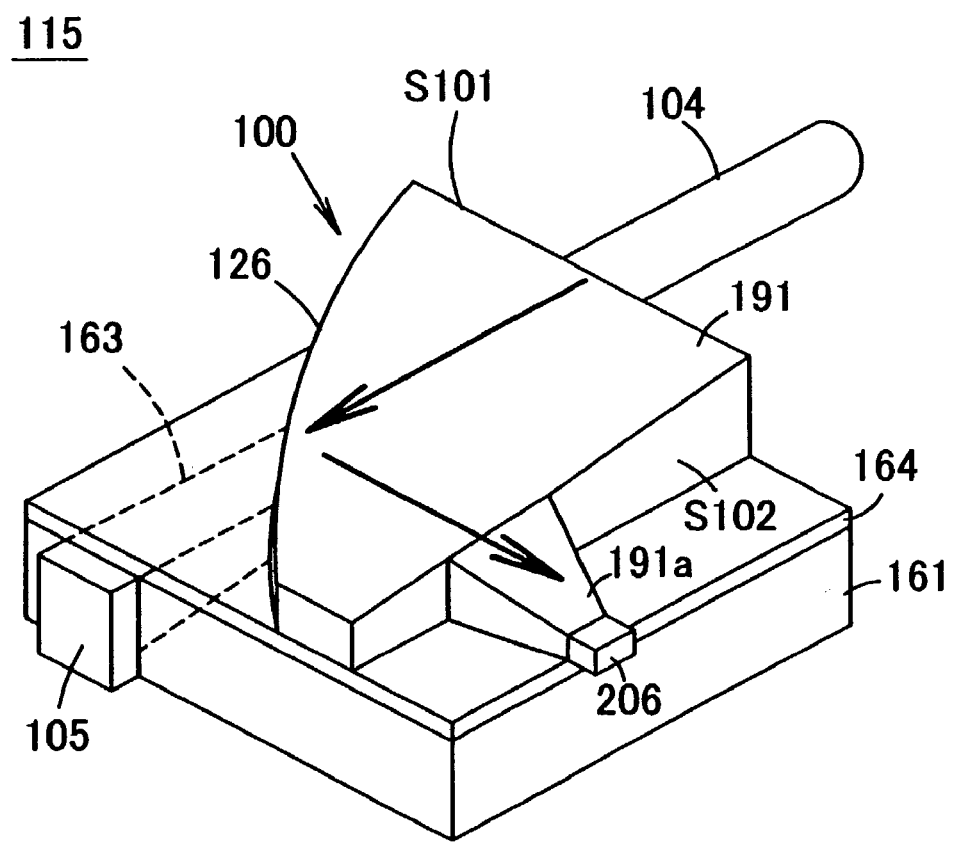
FIG. 24 shows a perspective view of an application example to an optical transceiver according to still another preferred embodiment of the present invention.
Figure 25A:
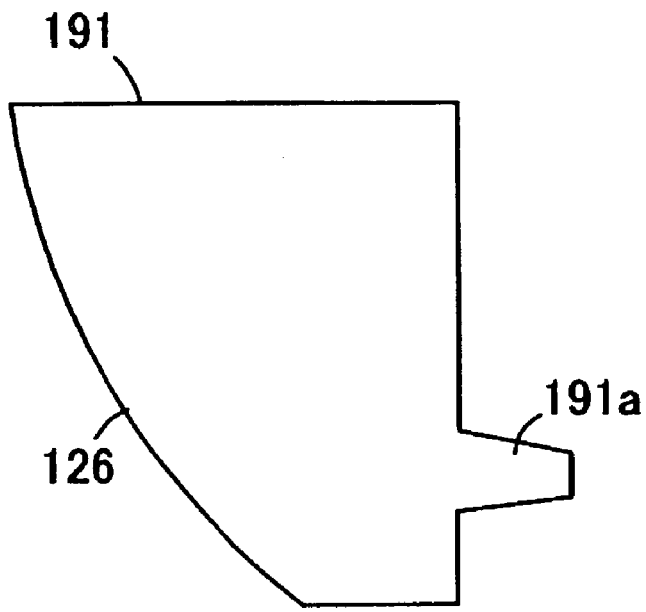
FIGS. 25A and 25B respectively show a top view and a right side view of a light receiving core of the optical transceiver shown in FIG. 24.
Figure 25B:
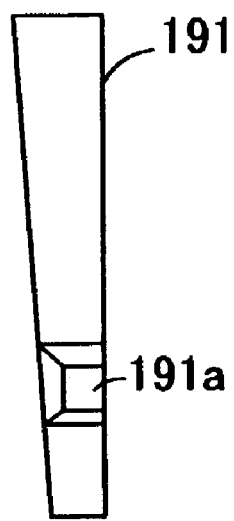

FIGS. 24 and 25 show an example of an application of an optical element according to the present invention to still another optical device. FIG. 24 shows a perspective view of an application example to an optical transceiver 115. FIGS. 25A and 25B respectively show a top view and a right side view of a light path converting element 191 (An optical wave combiner and separator 101, or an optical wave combiner and brancher 102 or 103 may also be employed in the place. This is the same hereinafter.) to be employed as a receiving core of the optical transceiver 115 shown in FIG. 24. This optical transceiver 115 is embodied as one wherein a light projecting element 105, an optical fiber 104 and a compact light receiving element 206 for high speed communication are optically connected to the light path converting element 191.

The optical transceiver 115 comprises a cladding substrate 161, a transmitting core 163 formed in the slot on the surface of the cladding substrate 161, a separation layer 164 formed on the cladding substrate 161, and a light path converting element 191 formed on the separation layer 164. A light projecting element 105 is arranged at a position to face the light incoming end surface of the transmitting core 163, while an optical fiber 104 is arranged at a position to face the light outgoing end of the transmitting core 163 and the light incoming end of the light path converting element 191. Also, a light receiving element 206 is arranged at a position to face the end surface of a protruded portion 191a of the light path converting element 191.

As shown FIGS. 25A and 25B, the light path converting element 191 of the optical transceiver 115 has a shape in which near the light outgoing end of the light receiving core (light path converting element 100) of the optical transceiver 112, as shown in the perspective view in FIG. 19 and the exploded perspective view in FIG. 20, a protruded portion 191a is added having a taper so that the height and the width becomes gradually narrower toward the end thereof. The end surface of this protruded portion 191a becomes the light outgoing surface of the light path converting element 191. The inclination of each plane configuring the protruded portion 191a is designed so that the area and shape of the end surface of the protruded portion 191a are suitable for the light receiving surface of the light receiving element 206.

However, for the purpose of restricting transmitting loss in the protruded portion 191a, it is preferable that each side surface configuring the protruded portion 191a is arranged at an inclination for light to go in at an angle over total reflection angle. While, in FIG. 24, a taper is formed in height and width directions, however, a taper may be formed on either in height direction or in width direction.

In the structure mentioned above, light ejected from the optical fiber 104 toward the light incoming end of the light path converting element 191 is reflected by the light path converting surface 126 of the light path converting element 191 and the transmitting direction thereof is changed by about 90 degrees, and light goes into the protruded portion 191a. The opening portion at the light incoming side of the protruded portion 191a has an area enough for all or most of light reflected by the optical path converting surface 126, and also is arranged at such a position for all or most of light reflected by the light path converting surface 126. The area of the end surface at the light outgoing side of the protruded portion 191a is made smaller than that of the light receiving surface of the light receiving element 206. As a result, light going into the protruded portion 191a reflects on the upper and lower surfaces or the left and right surfaces thereof, and converges toward the light receiving surface of the light receiving element 206, consequently, it is possible to make light go into the light receiving element 206 without loss.

As in the optical transceiver 112 as shown in FIG. 19, if the entire surface of one side surface of the receiving core (light path converting element 100) is made as a light outgoing end surface, the cross sectional area of light beam going from the optical fiber 104 into the receiving core (light path converting element 100) becomes similar to the cross sectional area of light beam ejected from the receiving core (light path converting element 100) to the light receiving element 106. Therefore, if an optical fiber 104 having a relatively large beam cross sectional area was to be used, it was not possible to make the cross sectional area of outgoing light as small as the area of the light receiving area of the light receiving element 206 to be used for compact size high communication smaller than the light receiving element 106. Therefore, even if a high speed communication light receiving element 206 of a small light receiving surface area is arranged and connected to a receiving core (light path converting element 100) as shown in FIG. 19, light will not be received sufficiently by the light receiving surface, and as a result, connection loss will become large.

However, according to the optical transceiver 115 of the present preferred embodiment shown in FIG. 24, the protruded portion 191a is arranged on the light path converting element 191, and the light outgoing end is formed so as to meet the shape and size of the light receiving surface of the light receiving element 206. As a result, it is possible to restrict connection loss with light receiving elements.

What is claimed is:

1. An optical element made of transparent material with a high refractive index comprising:
    a light incoming surface, a light outgoing surface that is not parallel with the light incoming surface, a pair of planes that are facing each other, and a curved light path converting surface, wherein
    the pair of planes is formed nearly perpendicular to the light incoming surface and the light outgoing surface,
    the distance between the pair of planes of the optical element becomes smaller gradually from the light incoming surface toward the light outgoing surface,
    the curved light path converting surface is formed nearly perpendicular to the pair of planes, and the shape thereof is defined so as to reflect and converge light coming from the light incoming surface,
    the light coming in from the light incoming surface goes toward the light path converting surface, and via a light path for the light to be reflected and converged on the light path converting surface and go out from the light outgoing surface, and
    when the light path is projected onto a plane parallel to the planes, the light is reflected substantially only on the light path converting surface.

2. An optical element according to claim 1, wherein the light path converting surface is covered with a reflective film, and the light coming from the light incoming surface into the optical element is reflected on the reflective film and goes out from the light outgoing surface.

3. An optical element according to claim 1, wherein a half mirror is formed on the light path converting surface, and part of the light coming from the light incoming surface into the optical element penetrates through the light path converting surface, and other of the light is reflected on the light path converting surface and goes out from the light outgoing surface.

4. An optical element according to claim 1, wherein a grating is formed on the light path converting surface, light of a specific wavelength among the light coming from the light incoming surface into the optical element penetrates through the light path converting surface, and light of other wavelength is reflected on the light path converting surface and goes out from the light outgoing surface.

5. An optical element according to claim 1, wherein plural curved surfaces having different light focuses are formed on the light path converting surface, and when the light coming from the light incoming surface into the optical element reflects on the light path converting surface, the light is branched by the plural curved surfaces, and goes out from different portions of the light outgoing surface.

6. An optical element according to claim 1, wherein protruded portion is arranged on the light outgoing surface so as to protrude from the light outgoing surface to the outside of the optical element, and the protruded portion protrudes in the direction perpendicular to the light outgoing surface, and is formed so that the cross sectional area of the surface parallel to the light outgoing surface becomes smaller gradually from the light outgoing surface toward the outside, and light reaching the light outgoing surface goes through the inside of the protruded portion, and is converged.

7. An optical element made of transparent material with a high refractive index comprising:

a light incoming surface, a light outgoing surface that is not parallel with the light incoming surface, a pair of planes that are facing each other, and a bent light path converting surface, wherein the pair of planes is formed nearly perpendicular to the light incoming surface and the light outgoing surface, the distance between the pair of planes of the optical element becomes smaller gradually from the light incoming surface toward the light outgoing surface, the bent light path converting surface is formed nearly perpendicular to the pair of planes, and the shape thereof is defined so as to reflect and converge light coming from the light incoming surface, the light coming in from the light incoming surface goes toward the light path converting surface, and via a light path for the light to be reflected and converged on the light path converting surface and go out from the light outgoing surface, and when the light path is projected onto a plane parallel to the planes, the light is reflected substantially only on the light path converting surface.

8. An optical device comprising:

a light projecting element, a light receiving element, a first optical element made of transparent material with a high refractive index, and a second optical element made of transparent material with a high refractive index, wherein the first optical element comprises a first light incoming surface, a first light outgoing surface that is not parallel with the light incoming surface, a pair of planes that are facing each other, and a curved light path converting surface, the pair of planes is formed nearly perpendicular to the first light incoming surface and the first light outgoing surface, the distance between the pair of planes of the optical element becomes smaller gradually from the light incoming surface toward the light outgoing surface, the curved light path converting surface is formed nearly perpendicular to the pair of planes, and the shape thereof is defined so as to reflect and converge light coming from the first light incoming surface, the light coming in from the first light incoming surface goes toward the light path converting surface, and via a light path for the light to be reflected and converged on the light path converting surface and go out from the first light outgoing surface, when the light path is projected onto a plane parallel to the planes, the light is reflected substantially only on the light path converting surface, the second optical element comprises a triangular prism made of transparent material with a high refractive index that reflects light coming in from a second light incoming surface and transmit the light to a second light outgoing surface, a light focusing lens arranged on the second light incoming surface, the first optical element and the second optical element are arranged so that the first light incoming surface and the second light outgoing surface are connected with an optical fiber, the light projecting element is arranged so that light goes into the lens of the second light incoming surface, the light receiving element is arranged on the first light outgoing surface to which the light coming in from the first light incoming surface reflects on the light path converting surface and is converged.

9. An optical device comprising:

a light projecting element, a light receiving element, a first optical element made of a transparent material with a high refractive index, and a second optical element, wherein the first optical element comprises a first light incoming surface, a first light outgoing surface that is not parallel with the first light incoming surface, a pair of planes that are facing each other, and a curved light path converting surface, the pair of planes is formed nearly perpendicular to the first light incoming surface and the first light outgoing surface, the distance between the pair of planes of the optical element becomes smaller gradually from the light incoming surface toward the light outgoing surface, the curved light path converting surface is formed nearly perpendicular to the pair of planes, and the shape thereof is defined so as to reflect and converge light coming from the first light incoming surface, the light coming in from the first light incoming surface goes toward the light path converting surface, and via a light path for the light to be reflected and converged on the light path converting surface and go out from the first light outgoing surface, when the light path is projected onto a plane parallel to the planes, the light is reflected substantially only on the light path converting surface, the second optical element comprises a core made of a transparent material with a high refractive index that transmits light coming in from a second light incoming surface to a second light outgoing surface, a cladding substrate made of a material that surrounds the core and whose refractive index is lower than that of the core, wherein the core cross sectional area of the surface parallel to the second light incoming surface is characterized by becoming smaller gradually from the second light incoming surface toward the second light outgoing surface, the first optical element and the second optical element are laminated via a separating layer so that the first light incoming surface and the second light outgoing surface are on a same level plane, the light projecting element is arranged near the second light incoming surface, the light receiving element is arranged near the first light outgoing surface to which the light coming in from the first light incoming surface reflects on the light path converting surface and is converged.

10. An optical device comprising:

a light projecting element, a light receiving element, a first optical element made of transparent material with a high refractive index, and a second optical element, wherein the first optical element comprises a first light incoming surface, a first light outgoing surface that is not parallel with the first light incoming surface, a pair of planes that are facing each other, and a curved light path converting surface, the pair of planes is formed nearly perpendicular to the light incoming surface and the light outgoing surface, the distance between the pair of planes of the optical element becomes smaller gradually from the light incoming surface toward the light outgoing surface, the curved light path converting surface is formed nearly perpendicular to the pair of planes, and the shape thereof is defined so as to reflect and converge light coming from the light incoming surface, the light coming in from the first light incoming surface goes toward the light path converting surface, and via a light path for the light to be reflected and converged on the light path converting surface and go out from the first light outgoing surface, when the light path is projected onto a plane parallel to the planes, the light is reflected substantially only on the light path converting surface, the second optical element comprises a core made of a high refractive index transparent material with a high refractive index that transmits light coming in from a second light incoming surface to a second light outgoing surface, a cladding substrate made of a material that surrounds the core and whose refractive index is lower than that of the core, wherein the core cross sectional area of the surface parallel to the second light incoming surface is characterized by becoming smaller gradually from the second light incoming surface toward the second light outgoing surface, the first optical element and the second optical element are laminated via a separating layer so that the first light outgoing surface and the second light incoming surface are on a same level plane, the light projecting element is arranged near the first light incoming surface, the light receiving element is arranged near the second light outgoing surface.

11. An optical device comprising:

an optical element made of a transparent material with a high refractive index, and an input/output terminal, wherein the optical element comprises a light incoming surface, a light outgoing surface that is not parallel with the light incoming surface, a pair of planes that are facing each other, and a curved light path converting surface, the pair of planes is formed nearly perpendicular to the light incoming surface and the light outgoing surface, the distance between the pair of planes of the optical element becomes smaller gradually from the light incoming surface toward the light outgoing surface, the curved light path converting surface is formed nearly perpendicular to the pair of planes, and the shape thereof is defined so as to reflect and converge light coming from the light incoming surface, the light coming in from the light incoming surface goes toward the light path converting surface, and via a light path for the light to be reflected and converged on the light path converting surface and go out from the light outgoing surface, when the light path is projected onto a plane parallel to the planes, the light is reflected substantially only on the light path converting surface, the input/output terminal is connected so as to be combined with light going out from the light outgoing surface of the optical element, and the optical element and the input/output terminal are made into one body.

* * * * *